(12) United States Patent
Danilov et al.

(10) Patent No.: US 11,023,145 B2
(45) Date of Patent: *Jun. 1, 2021

(54) HYBRID MAPPED CLUSTERS FOR DATA STORAGE

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/526,142

(22) Filed: Jul. 30, 2019

(65) Prior Publication Data
US 2021/0034261 A1 Feb. 4, 2021

(51) Int. Cl.
*G06F 3/06* (2006.01)
*G06F 11/10* (2006.01)

(52) U.S. Cl.
CPC .......... *G06F 3/0631* (2013.01); *G06F 3/0604* (2013.01); *G06F 3/0659* (2013.01); *G06F 3/0673* (2013.01); *G06F 11/1076* (2013.01)

(58) Field of Classification Search
None
See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 5,950,225 A | 9/1999 | Kleiman |
| 6,502,243 B1 | 12/2002 | Thomas |
| 7,389,393 B1 | 6/2008 | Karr et al. |
| 7,577,091 B2 | 8/2009 | Antal et al. |
| 7,631,051 B1 | 12/2009 | Fein et al. |
| 7,664,839 B1 | 2/2010 | Karr et al. |

(Continued)

OTHER PUBLICATIONS

Non-Final Office Action received for U.S. Appl. No. 16/209,185 dated Jun. 18, 2020, 22 pages.

(Continued)

*Primary Examiner* — Kevin Verbrugge
(74) *Attorney, Agent, or Firm* — Amin, Turocy & Watson, LLP

(57) ABSTRACT

A hybrid mapped redundant array of independent nodes (mapped RAIN) for data storage is disclosed. A hybrid mapped RAIN cluster can be allocated on top of one or more real data clusters comprising storage devices of different storage device types. Mapping of data storage locations in a hybrid mapped RAIN cluster can facilitate use of a real cluster at a different granularity than conventionally administered in a real cluster of storage locations, can enable selectable use of the different storage device types based on attributes attributed to the storage device types, how data will be stored, customer agreements, etc. Data storage schema associated with the storage device types can result in constraints on allocating storage devices of the different storage device types in a hybrid mapped RAIN cluster to forestall possible data loss events. A hybrid mapped RAIN cluster based on storage device types can enable tiered mapped storage.

20 Claims, 10 Drawing Sheets

(56) References Cited

U.S. PATENT DOCUMENTS

| | | |
|---|---|---|
| 7,680,875 B1 | 3/2010 | Shopiro et al. |
| 7,721,044 B1 | 5/2010 | Chatterjee et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,540,625 B2 | 9/2013 | Miyoshi |
| 8,751,599 B2 | 6/2014 | Tran et al. |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,972,478 B1 | 3/2015 | Storer et al. |
| 9,003,086 B1 * | 4/2015 | Schuller ............... G06F 3/067 710/62 |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Fineberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Gladwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Saifare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 9/2016 | Manville et al. |
| 2016/0294419 A1 | 10/2016 | Sandell et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |

(56) References Cited

U.S. PATENT DOCUMENTS

| | | |
|---|---|---|
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Martin Hosken, Developing a Hyper-Converged Storage Strategy for VMware vCloud Director with VMware vSAN, Jan. 2018 (Year 2018).

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Natarajan, RAID 0, RAID 1, RAID 5, RAID 10 Explained with Diagrams, Aug. 10, 2010, thegeekstuff.com (18 pages).

Final Office Action received for U.S. Appl. No. 16/010,255 dated Jul. 23, 2020, 36 pages.

Office Action received for U.S. Appl. No. 16/010,246 dated Jul. 27, 2020 36 pages.

Office Action received for U.S. Appl. No. 16/177,278, dated Aug. 21, 2020, 70 pages.

Office Action received for U.S. Appl. No. 16/179,486, dated Aug. 13, 2020, 95 pages.

Guo et al., "GeoScale: Providing Geo-Elasticity in Distributed Clouds" 2016 IEEE International Conference on Cloud Engineering, 4 pages.

Guo et al., "Providing Geo-Elasticity in Geographically Distributed Clouds". ACM Transactions on Internet Technology, vol. 18, No. 3, Article 38. Apr. 2018. 27 pages.

Office Action received for U.S. Appl. No. 16/254,073, dated Aug. 18, 2020, 62 pages.

Non-Final Office Action received for U.S. Appl. No. 16/177,285 dated Jul. 22, 2020, 31 pages.

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Non-Final Office Action received for U.S. Appl. No. 15/651,504 dated Mar. 21, 2019, 10 pages.

Non-Final Office Action received for U.S. Appl. No. 15/662,273 dated Nov. 16, 2018, 19 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Wikipedia, "Standard Raid Levels—RAID 6", URL: https://en.wikipedia.org/wiki/Standard_RAID_levels#RAID_6, Oct. 18, 2019, 11 pages.

(56) References Cited

OTHER PUBLICATIONS

Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177, 278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/261,548 dated Jan. 6, 2021, 56 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.

* cited by examiner

HYBRID MAPPED CLUSTERS FOR DATA STORAGE

TECHNICAL FIELD

The disclosed subject matter relates to data storage, more particularly, to mapping storage pools comprising storage devices of at least one array of storage devices, wherein the storage devices comprise storage devices of different storage device types.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise disks arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein. Moreover, data storage in conventional clusters can be insensitive to the types of disks, e.g., disk types, comprising a cluster. As an example, data can be arbitrarily stored by a high RPM hard disk or by a low RPM hard disk, which can each be associated with different data storage characteristics, e.g., access speed, reliability, monetary cost, energy consumption cost, maintenance cost, mean time before failure, etc. It can be desirable to store data based on a disk type, or more generally, based on a storage device type, to leverage the characteristics associated with the storage device type, as is disclosed in more detail herein below.

DETAILED DESCRIPTION

Figure 1:
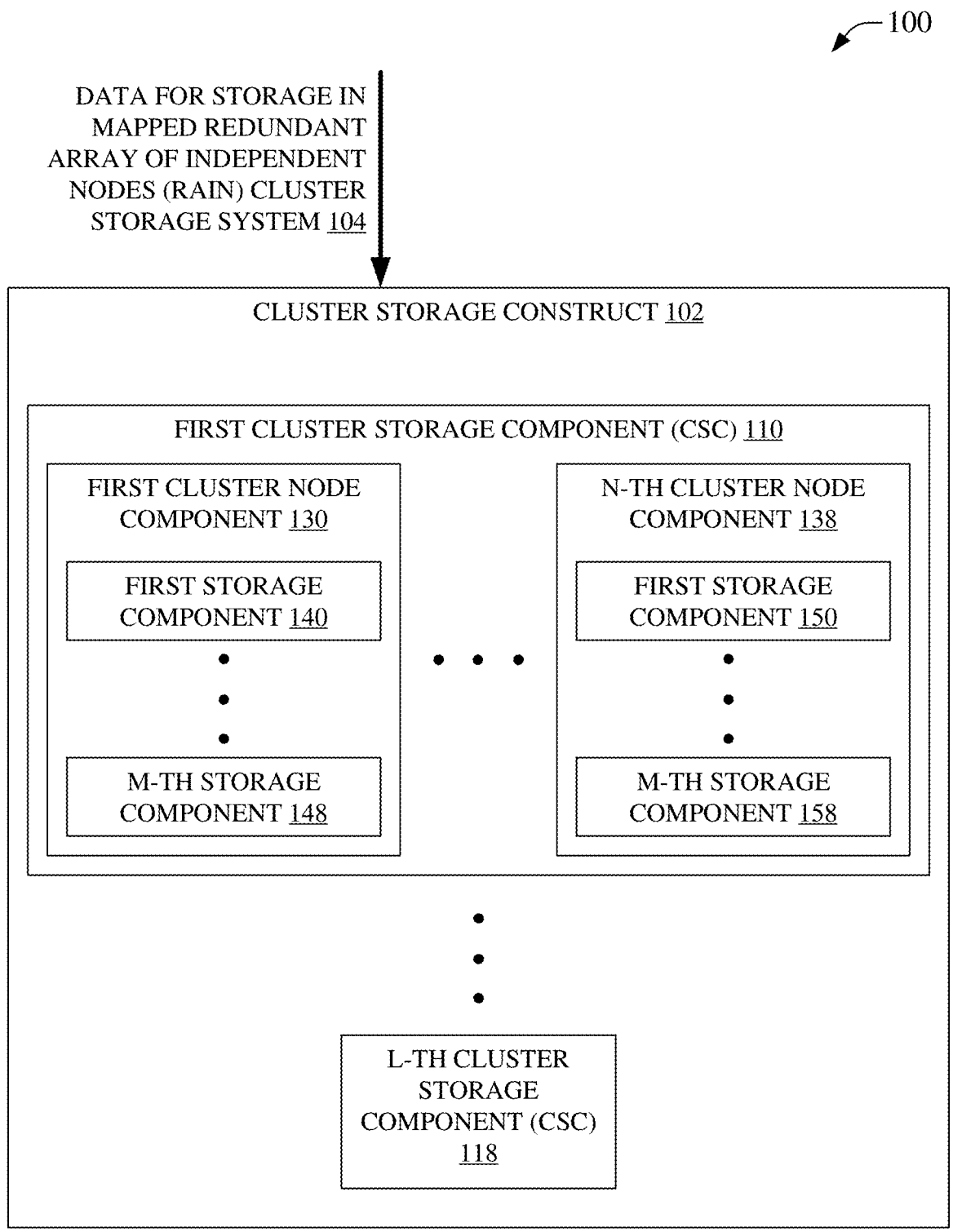
FIG. 1 is an illustration of an example system that can facilitate storage of data in a mapped redundant array of independent nodes, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

In an embodiment of the presently disclosed subject matter, a mapped redundant array of independent nodes, hereinafter a mapped RAIN, can comprise a mapped cluster, wherein the mapped cluster comprises a logical arrangement of real storage devices. In a mapped cluster, a real cluster(s), e.g., a group of real storage devices comprised in one or more hardware nodes, comprised in one or more clusters, can be defined to allow more granular use of the real cluster in contrast to conventional storage techniques. In an aspect, a mapped cluster can comprise nodes that provide data redundancy, which, in an aspect, can allow for failure of a portion of one or more nodes of the mapped cluster without loss of access to stored data, can allow for removal/addition of one or more nodes from/to the mapped cluster without loss of access to stored data, etc. As an example, a mapped cluster can comprise nodes having a data redundancy scheme analogous to a redundant array of independent disks (RAID) type-6, e.g., RAID6, also known as double-parity RAID, etc., wherein employing a node topology and two parity stripes on each node can allow for two node failures before any data of the mapped cluster becomes inaccessible, etc. In other example embodiments, a mapped cluster can employ other node topologies and parity techniques to provide data redundancy, e.g., analogous to RAID0, RAID1, RAID2, RAID3, RAID4, RAID5, RAID6, RAID0+1, RAID1+0, etc., wherein a node of a mapped cluster can comprise one or more disks, and the node can be loosely similar to a disk in a RAID system. Unlike RAID technology, an example mapped RAIN system can provide access to more granular storage in generally very large data storage systems, often on the order of terabytes, petabytes, exabytes, zettabytes, etc., or even larger, because each node can generally comprise a plurality of disks, unlike RAID technologies.

In an embodiment, software, firmware, etc., can hide the abstraction of mapping nodes in a mapped RAIN system, e.g., the group of nodes can appear to be a contiguous block of data storage even where, for example, it can be spread across multiple portions of one or more real disks, multiple real groups of hardware nodes (a real RAIN), multiple real clusters of hardware nodes (multiple real RAINs), multiple geographic locations, etc. For a given real cluster, e.g., real RAIN, that is N nodes wide and M disks deep, a mapped RAIN can consist of up to N' mapped nodes and manage up to M' portions of disks of the constituent real nodes. Accordingly, in an embodiment, one mapped node is expected to manage disks of different real nodes. Similarly, in an embodiment, disks of one real node are expected to be managed by mapped nodes of different mapped RAIN clusters. In some embodiments, the use of two disks by one real node can be forbidden to harden mapped RAIN clusters against a failure of one real node compromising two or more mapped nodes of one mapped RAIN cluster, e.g., a data loss event, etc. Hereinafter, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey a distinction from a corresponding real physical hardware component.

In an embodiment, the group of nodes can appear to be a non-contiguous block of data storage comprising different data storage device types. As an example, a group of nodes can be spread across multiple portions of real disks of different disk types, across multiple real groups of hardware nodes comprising storage devices of different storage device types, across multiple real clusters of hardware nodes comprising storage devices of different storage device types, across multiple geographic locations comprising storage devices of different storage device types, etc. In an aspect, storage devices of a first type can appear contiguous but distinct from a storage device(s) of a second type, wherein storage devices of the second type can also appear contiguous. In another aspect, storage devices of different storage device types can also appear contiguous, e.g., some storage devices of a first type can appear contiguous with some storage devices of a second type, which can enable donation of some devices of the first and second types to a contiguous portion of storage while also enabling reserving some device of the first type and/or the second type for other storage. As an example, for a cluster comprising two disks of a first type and two disks of a second type, all four disks can appear to be one contiguous data store, two disks of the first type can appear to be a first contiguous store and two disks of the second type can appear to be a second contiguous store, a first disk of the first type and a second disk of the second type can appear to be a contiguous store while the other two disks appear as another contiguous store, the two disks of the first type and one of the disks of the second type can appear to be a contiguous store while the fourth disk appears as another contiguous store, etc. This can enable high levels of flexibility in apportioning storage space across a real cluster comprising real nodes comprising real storage devices of one or more storage device types. As an example, a cluster can comprise solid state storage devices (SSDs), hard disk drives (HDDs), random access memory (RAM) devices, magnetic random access memory (MRAM) devices, optical storage devices, or nearly any other type of storage device. In an aspect, a real cluster comprising different storage device types can be termed a hybrid real cluster, a mapped cluster comprising mapped relationships to real storage devices of different storage device types can be termed a hybrid mapped cluster, etc., however, it is noted that the disclosed subject matter can refer to a hybrid real/mapped cluster as a real/mapped cluster, which is intended to communicate that the real/mapped cluster can comprise one or more different storage device types, unless explicitly or implicitly indicating otherwise.

The different types of storage devices can be associated with different performance characteristics. Moreover, the different types can comprise different sub-types, which are generally treated as separate types hereinafter, e.g., a first type of HDD can be a 7200 RPM drive, a second type of HDD can be a 10,000 RPM drive, a third type of HDD can be a 5400 RPM drive, etc. In an aspect, a storage device type can be termed a 'class' of device, e.g., a 5400 RPM HDD can be a first class of device, a 7200 RPM HDD can be a second class of device, etc. In addition, there can be more than one group of devices of a particular class of devices, e.g., a first group of 5400 RPM HDDs and a second group of 5400 RPM HDDs, a third group of 5400 RPM HDDs, etc. In an aspect, a storage device type, class, etc., can correspond to characteristics of the devices of the type, class, etc. As an example, a type, class, etc., can relate to a brand of storage device, a speed of a storage device, an age of a storage device, etc., e.g., a first class of storage devices can be 5400 RPM HDDs, a second class of storage devices can be SSDs that have performed a threshold level of read/write operations, a third class of storage devices can be HDDs installed after a threshold date, etc. The differing characteristics can be leveraged to selectively store data based on a storage device type, for example, newly arriving data can be stored in a SSD based on the SSD being associated with fast data access, e.g., the SSD can act similar to a read/write cache, data that is interacted with above a first threshold level can be stored on a 10,000 RPM HDD that can be slower than the SSD but can be more affordable than the SSD, while 'cold' data, e.g., data that isn't accessed above a second threshold level can be stored in a 5400 RPM HDD that can be very low cost but can be associated with much slower data access times than the other storage device types. However, the disclosed subject matter can also enable use of different storage device types for the same types of storage. As an example, a data center originally implemented with all 5400 RPM HDDs can be updated to include some SSDs and some 7200 RPM HDDs such that newly arriving data can be selectively stored in a SSD based on the SSD being associated with fast data access, while other data can be indiscriminately stored on either a 7200 RPM HDD or on a 5400 RPM HDD. As an example, a data center that runs out of storage space on 5400 RPM HDDs can write additional data to 7200 RPM HDDs in a contiguous manner. It is noted that the differentiation between storage devices of different storage device types, in some embodiments, can enable tiered data storage, e.g., incoming data, hot data, cold data, etc., can be stored on different storage devices of different storage device types comprised in a real cluster and supporting a mapped cluster, which mapped cluster can be termed as a hybrid mapped cluster, e.g., a mapped cluster employing different real storage device types as is disclosed herein. It is noted, for the sake of clarity and brevity, that the term 'disk' or 'drive', as used herein, can refer to any storage device and is not constrained to an actual disk or an actual drive, e.g., disk/drive can indicate a HDD, a SSD, a RAM, a MRAM, an optical storage device, etc., and, accordingly, the term 'disk type' or 'drive type' can refer to a storage device type, e.g., a 'disk of a first disk type' or a 'drive of a first type' can be interpreted as a 'storage device of a first storage device type,' unless explicitly or implicitly indicated otherwise.

In an embodiment, a mapped cluster can be comprised in a real cluster, e.g., the mapped cluster can be N' by M' in size, wherein N' is a count of mapped nodes and M' is a count of mapped disks, and the real cluster can be N by M in size, N is a count of real nodes, M is a count of real disks, and where N'=N and where M'=M. In other embodiments, N' can be less than, or equal to, N, and M' can be less than, or equal to, M. It will be noted that in some embodiments, M' can be larger than M, e.g., where the mapping of a M real disks into M' mapped disks portions comprises use of a part of one of the M disks, for example, where 10 real disks (M=10) are mapped into 17 mapped disk portions (M'=17), 11 mapped disk portions (M'=11), 119 mapped disk portions (M'=119), etc. In these other embodiments, the mapped cluster can be smaller than the real cluster. Moreover, where the mapped cluster is sufficiently small in comparison to the real cluster, the real cluster can accommodate one or more additional mapped clusters. In an aspect, where mapped cluster(s) are smaller than a real cluster, the mapped cluster can provide finer granularity of the data storage system. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately 1/16th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first cluster having hardware nodes in a first data center in Seattle, Wash., and a second data center having hardware nodes in Tacoma, Wash. As another example, a mapped cluster can comprise storage space from a first cluster having hardware nodes in a first data center in Houston, Tex., and a second cluster having hardware nods in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage of data in a mapped redundant array of independent nodes, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. In an aspect, the one or more storage devices can be of one or more storage device types. Cluster storage construct 102 can receive data for storage in a mapped cluster, e.g., data for storage in mapped RAIN cluster storage system 104, etc., hereinafter data 104 for brevity. Data 104 can be stored by portions of the one or more storage devices of cluster storage construct 102 according to a logical mapping of the storage space, e.g., according to one or more mapped clusters.

In an aspect, a mapped cluster can be a logical allocation of storage space from cluster storage construct 102. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc. Accordingly, in an embodiment, cluster storage construct 102 can support a mapped cluster enabling data 104 to be stored on one or more disk, e.g., first disk component 140 through M-th disk component 148 of first cluster node component 130 through first disk component 150 through M-th disk component 158 of N-th cluster node component 138 of first cluster storage component (CSC) 110, through disks corresponding to CSCs of L-th cluster storage component 118, according to a mapped cluster schema. In an aspect, the storage of data 104 in the mapped cluster via the real cluster can be based on an associated storage device type(s). In an aspect, a mapped cluster control component (MCCC), e.g., mapped cluster control component 220-620, etc., can coordinate storage of data 104 on storage elements, e.g., disks, of a real cluster of cluster storage construct 102 according to a mapping of a mapped cluster, e.g., mapped cluster control component 220-620, etc., can indicate where in cluster storage construct 102 data 104 is to be stored, cause data 104 to be stored at a location in in cluster storage construct 102 based on the mapping of the mapped cluster, etc., wherein the mapping can reflect a storage device type(s).

In an embodiment, a mapped cluster employing cluster storage construct 102 can be comprised in one or more portions of one or more real cluster, e.g., a portion of one or more disks of first CSC 110-L-th CSC 118, etc. Moreover, the mapped cluster can be N' nodes by M' disks in size and the one or more real clusters of cluster storage construct 102 can be N nodes by M disks in size, where N' can be less than, or equal to, N, and M' can be less than, or equal to, or greater than, M. In these other embodiments, the mapped cluster can be smaller than cluster storage construct 102. Moreover, where the mapped cluster is sufficiently small in comparison to cluster storage construct 102, one or more additional mapped clusters can be accommodated by cluster storage construct 102. In an aspect, where mapped cluster(s) are smaller than cluster storage construct 102, the mapped cluster can provide finer granularity of the data storage system. As an example, where cluster storage construct 102 is 8×8, e.g., 8 nodes by 8 disks, then, for example, four mapped 4×4 clusters can be provided, wherein each of the four mapped 4×4 clusters is approximately ¼th the size of cluster storage construct 102. As a second example, given an 8×8 cluster storage construct 102, 16 mapped 2×2 clusters can be provided where each mapped cluster is approximately ¹⁄₁₆th the size of cluster storage construct 102. As a third example, for the example 8×8 cluster storage construct 102, two mapped 4×8 or 8×4 clusters can be provided and each can be approximately ½ the size of cluster storage construct 102. Additionally, the example 8×8 cluster storage construct 102 can provide a mix of different sized mapped clusters, for example one 8×4 mapped cluster, one 4×4 mapped cluster, and four 2×2 mapped clusters. These examples can comprise storage devices of one or more storage device types. In some embodiments, not all of the storage space of cluster storage construct 102 must be allocated in a mapped cluster, e.g., an example 8×8 cluster storage construct 102 can comprise only one 4×4 mapped cluster with the rest of cluster storage construct 102 being unallocated, differently allocated, etc.

In some embodiments, a mapped cluster can comprise storage space from more than one real cluster, e.g., first CSC 110 through L-th CSC 118 of cluster storage construct 102. In some embodiments, a mapped cluster can comprise storage space from real nodes, e.g., first cluster node component 130, etc., in different geographical areas. In some embodiments, a mapped cluster can comprise storage space from more than one real cluster in more than one geographic location. As an example, a mapped cluster can comprise storage space from a cluster having hardware nodes in a data center in Denver, e.g., where first CSC 110 is embodied in hardware of a Denver data center. In a second example, a mapped cluster can comprise storage space from a first cluster having hardware nodes in a first data center in Denver and from a second cluster also having hardware nodes in the first data center in Denver e.g., where first CSC 110 and L-th CSC 118 are embodied in hardware of a Denver data center. As a further example, a mapped cluster can comprise storage space from both a cluster having hardware nodes in a first data center in Denver and a second data center in Denver e.g., where first CSC 110 is embodied in first hardware of a first Denver data center and where L-th CSC 118 is embodied in second hardware of a second Denver data center. As a further example, a mapped cluster can comprise storage space from a first cluster having hardware nodes in a first data center in Seattle, Wash., and a second data center having hardware nodes in Tacoma, Wash., e.g., where first CSC 110 is embodied in first hardware of a first Seattle data center and where L-th CSC 118 is embodied in second hardware of a second Tacoma data center. As another example, a mapped cluster can comprise storage space from a first cluster having hardware nodes in a first data center in Houston, Tex., and a second cluster having hardware nods in a data center in Mosco, Russia e.g., where first CSC 110 is embodied in first hardware of a first Houston data center and where L-th CSC 118 is embodied in second hardware of a second Mosco data center.

In an aspect, a mapped cluster control component, e.g., 220, etc., can allocate storage space of cluster storage component 102 based on an indicated level of granularity, an indicated storage device type, etc. In an aspect, the indicated level of granularity can be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In another aspect, the selection of storage devices based on performance criteria associated with different available storage device types can also be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In an aspect, these types of information, e.g., level of granularity, desired performance characteristics, etc., can be termed 'supplemental information', e.g., 222-422, etc., and said supplemental information can be used to allocate mapped storage space in a mapped cluster. In some embodiments, allocation can be unconstrained, e.g., any space or any disk type of cluster storage component 102 can be allocated into a mapped cluster. In other embodiments, constraints can be applied, e.g., a constraint can be employed by a mapped cluster control component to select or reject the use of some storage space of cluster storage construct 102 when allocating a mapped cluster. As an example, a constraint can restrict allocating two mapped clusters that each use a disk from the same real node, because difficulty accessing the real node can result in effects on two mapped clusters. As a second example, a constraint can restrict allocating fast storage, e.g., SSDs, fast HDDs, etc., based on a client/service profile, etc., e.g., faster storage devices can be reserved for a client that pays for faster data access. As a third example, a constraint can restrict allocating newer storage devices, e.g., storage devices that are less likely to fail due to age, etc., based on a client/service profile, etc., e.g., newer, e.g., more reliable, storage devices can be reserved for a client that pays for a higher level of data storage, etc. Other constraints can be readily appreciated, for example, based on a type of data redundancy schema, based on available/use storage space, based on network/computing resource costs, etc., and all such constraints are within the scope of the instant disclosure even where not recited for clarity and brevity.

Figure 2:
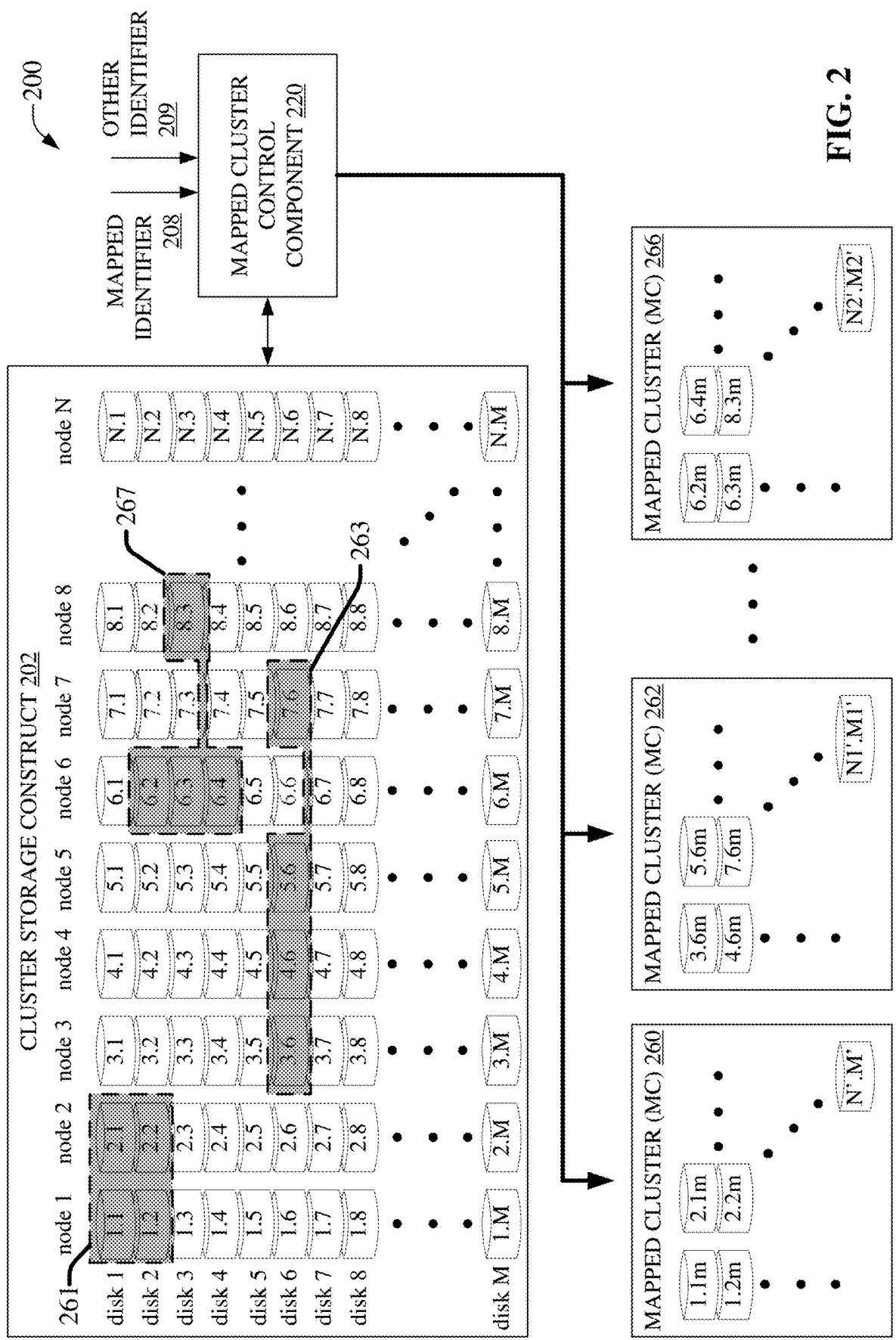
FIG. 2 illustrates an example system that can facilitate constrained storage of data in a mapped redundant array of independent nodes via a plurality of example mapped clusters, in accordance with aspects of the subject disclosure.

FIG. 2 is an illustration of a system 200, which can enable constrained storage of data in a mapped redundant array of independent nodes via a plurality of example mapped clusters, in accordance with aspects of the subject disclosure. System 200 can comprise cluster storage construct 202 that can be the same as, or similar to, cluster storage construct 102. Cluster storage construct 202 is illustrated at the disk and node level for ease of understating, e.g., disk 1.1 of disk 1 and node 1, for example, can be embodied in first disk component 140, disk 2.1, for example, can be embodied in first disk component 150, disk N.M, for example, can be embodied in a disk component of L-th CSC 118, etc. As is illustrated in this example embodiment, cluster storage construct 202 can comprise N nodes of M disks, e.g., disk 1.1 to N.M, etc. System 200 can comprise disk portions that can be of one or more disk types. Mapped cluster control component 220 can allocate one or more MC, e.g., MC 260-266, etc.

Mapped cluster control component 220 can be communicatively coupled to, or be included in, cluster storage construct 202. Mapped cluster control component 220 can allocate a mapped cluster (MC), e.g., MC 260-266, etc., which can logically embody storage comprised in cluster storage construct 202. In an embodiment, a MC can be allocated based on supplemental information, which can comprise information related to selection of a storage device based on a type of the storage device, e.g., storage device type, a data characteristic, customer or service information, etc. As an example, supplemental information 222 can indicate a first amount of storage of a first type is to be allocated to a mapped cluster and, in response, mapped cluster control component 220 can determine a number of, and identity of, disks of the disk type from cluster storage construct 202 that meet the first amount of storage. This example mapped cluster control component 220 can accordingly allocate the identified disks as a mapped cluster.

Mapped cluster control component 220 can facilitate storage of data via a mapped cluster in the allocated storage areas of cluster storage construct 202. As such, data can be stored in a more granular storage space than would conventionally be available, e.g., conventionally all disks of node 1, regardless of disk type, can be used to store data even where the 1 to M disk available storage space can far exceed an amount of storage needed, even where storage of some data can be inefficient such as storing cold data in an SSD, etc. As such, by mapping portions of a disk from a node into a mapped cluster, a lesser amount of storage space can be made available for storing the example first amount of storage and data storage devices can be selected based on performance attributes associated with the type of a data storage device. As an example, where a conventional storage cluster can allocate a minimum block of 1.2 petabytes, this can far exceed the example first amount of storage, such as where the first amount of storage can be related to storing a log file, moving data units from legacy systems that employed smaller storage unit sizes, etc., and accordingly, allocating and facilitating storage of data into mapped cluster that can have minimum block sizes less than the example 1.2 petabytes, can be desirable. As another example, a conventional storage cluster can be ignorant of the types of storage devices being selected and, as such, do not generally allocate data storage in a manner that leverages the performance characteristics of different types of storage devices, e.g., selecting some fast and some slow storage devices for a mapped cluster, for example where fast storage devices are much more expensive than slow storage devices, can allow storage of less frequently access data in the slower disks of a mapped cluster, and similarly store more frequently access data in the fast disks of the mapped cluster, to reduce the effective cost of the mapped cluster, e.g., using expensive SSDs to store cold data is not generally as cost efficient as using slow speed HDDs to store cold data.

Mapped cluster control component 220 can receive mapped identifier 208, other identifier 209, etc., which identifiers can enable directing data to disk portions of cluster storage construct 202 corresponding to a relevant mapped cluster, e.g., MC 260-266, etc. Mapped identifier 208 can be comprised in received data, e.g., data 104, etc., for example, a customer can indicate mapped identifier 208 when sending data for storage in a mapped cluster. Mapped identifier 208 can also be included in a request to access data. In an embodiment, mapped identifier 208 can indicate a logical location in a mapped cluster that can be translated by mapped cluster control component 220 to enable access to a real location of a disk portion in cluster storage construct 202. This can allow use of a logical location to access, e.g., read, write, delete, copy, etc., data from a physical data store. Other identifier 209 can indicate a real location rather than a mapped location, e.g., mapped cluster control component 220 can provide a real location based on the mapping of a mapped cluster, and such real location can then be used for future access to the real location corresponding to the mapped location.

In an embodiment, mapped cluster 260 can comprise, for example, disk portion 1.1*m*, 1.2*m*, 2.1*m*, 2.2*m*, . . . , N'.M', mapped cluster 262 can comprise, for example, disk portion 3.6*m*, 4.6*m*, 5.6*m*, 7.6*m*, . . . , N1'.M1', and mapped cluster 266 can comprise, for example, disk portion 6.2*m*, 6.3*m*, 6.4*m*, 8.3*m*, . . . , N2'.M2'. The example disk portions can map back to corresponding disk portion of cluster storage construct 202, e.g., MC 260 can map to disk portions 261 of cluster storage construct 202, MC 262 can map to disk portions 263 of cluster storage construct 202, MC 266 can map to disk portions 267 of cluster storage construct 202, etc. As can be observed, example system 200 does not violate the example constraints discussed in regard to system 400, e.g., no node contributes storage space to any two mapped clusters. Additionally, system 200 illustrates that mapped clusters can comprise contiguous portions of cluster storage construct 202, e.g., disk portions of 261 are illustrated as contiguous. System 200 further illustrates non-contiguous allocation, e.g., disk portions of 263 are illustrated as contiguous for portions 3.6, 4.6, and 5.6, but non-contiguous with disk portion 7.6. Disk portions of 263 are also illustrative of use of only one disk of cluster storage construct 202, e.g., all allocated disk portions of 263 are from disk 6 across four non-contiguous nodes. Disk portions 267 are similar non-contiguous and further illustrate that multiple disks of a node of cluster storage construct 202 can be comprised in a mapped cluster, e.g., disks 2-4 of node 6 of cluster storage construct 202 can be comprised in MC 266. It will be noted that other allocations can also be made without departing from the scope of the disclosed subject matter, e.g., another unillustrated mapped cluster could comprise disk portions from cluster storage construct 202 that are each from different nodes and different disks, etc., which allocations have not been explicitly recited for the sake of clarity and brevity.

Figure 3:
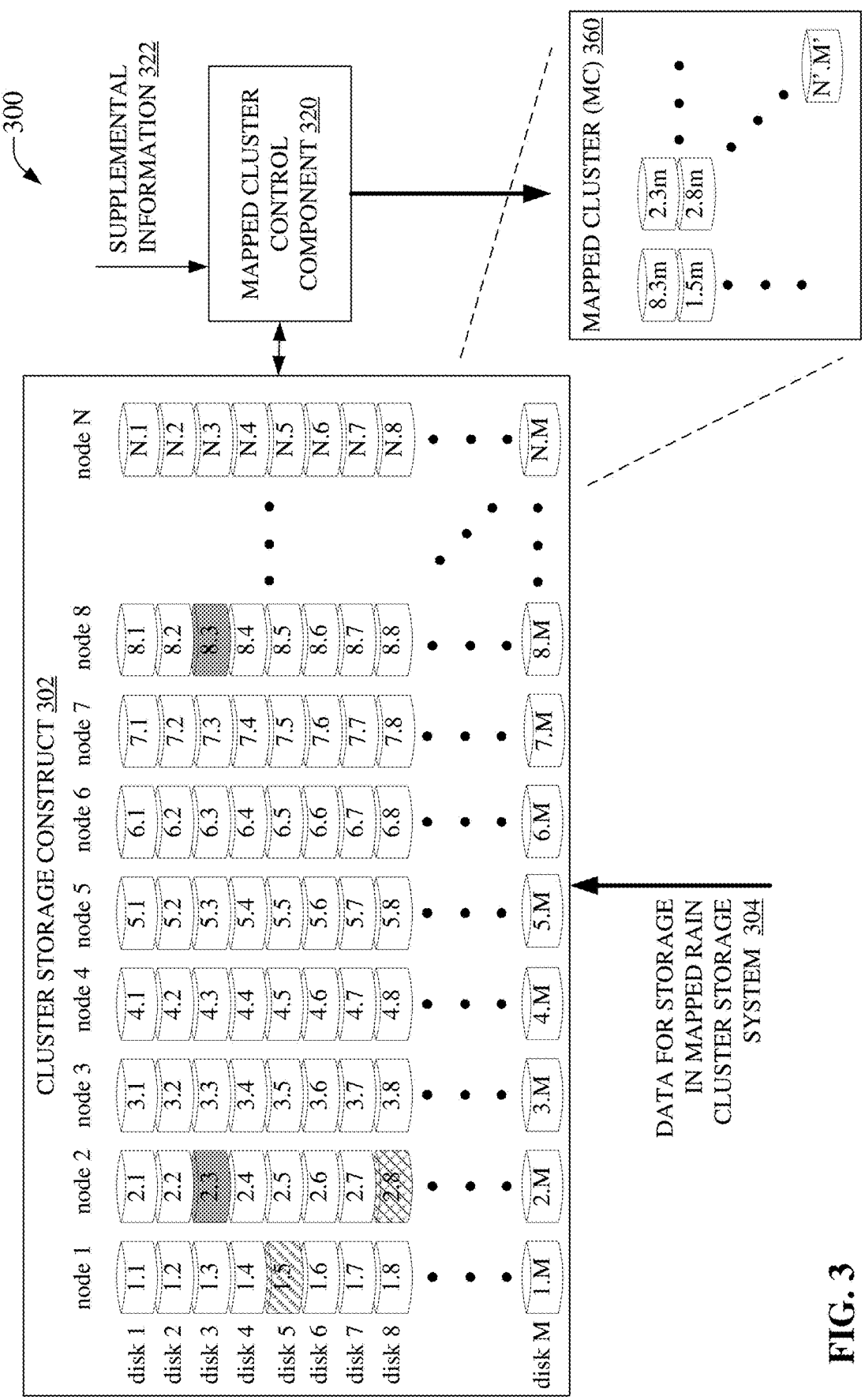
FIG. 3 is an illustration of an example system that can enable, via a mapped redundant array of independent nodes, storage of data in a plurality of mapped clusters comprising real disk portions of different disk types, in accordance with aspects of the subject disclosure.

FIG. 3 is an illustration of a system 300, which can facilitate, via a mapped redundant array of independent nodes, storage of data in a plurality of mapped clusters comprising real disk portions of different disk types, in accordance with aspects of the subject disclosure. System 300 can comprise cluster storage construct 302 that can comprise disk portions 1.1 to N.M in a manner that is the same as, or similar to, cluster storage construct 202. Mapped cluster control component 320 can allocate one or more MC, e.g., MC 360-362, etc. In an embodiment, allocation of MC 360-362 can be based on supplemental information 322 received by mapped cluster control component 320.

Mapped cluster 360 can comprise, for example, disk portion 8.3*m*, 2.3*m*, 1.5*m*, 2.8*m*, . . . , N'.M' and mapped cluster 362 can comprise, for example, disk portion 7.1*m*, 6.8*m*, 3.2*m*, 6.2*m*, . . . , N1'.M1'. The example disk portions can map back to corresponding disk portion of cluster storage construct 302, e.g., 8.3*m* can map to 8.3 of cluster storage construct 302 (not illustrated, but see 8.3 of FIG. 2, etc.), etc. Incoming data for storage, e.g., first data 304 and second data 306, etc., can then be stored according to the mapping of MC 360-362 based on one or more indications from mapped cluster control component 320, e.g., mapped cluster control component 320 can orchestrate or facilitate storage of first data 304, second data 306, etc., into the appropriate disk portion of MC 360-362, etc.

In an embodiment, the size of MC 360 can be the same or different from the size of MC 362. As an example, MC 360 can be allocated based on a first amount of storage, related to storing first data 304, and MC 362 can be allocated based on a second amount of storage, related to storing first data 306. In an aspect the corresponding amounts of storage can be indicated via supplemental information 322, can be based on data 304-306 themselves, etc. Moreover, in an embodiment, the size of a MC, e.g., MC 360-362, etc., can be dynamically adapted by mapped cluster control component 320, e.g., as data 304 transitions a threshold level, such as an amount of space occupied in MC 360, an amount of unused space in MC 360, etc., disk portions can be added to, or removed from MC 360 by mapped cluster control component 320. Additionally, adjusting the size of an MC can be based on other occupancy of cluster storage construct 302, e.g., by MC 362, etc., adding disks to cluster storage construct 302, removing disks form cluster storage construct 302, etc. As an example, where MC 362 uses 90% of cluster storage construct 302, the maximum size of MC 360 can be limited to about 10% by mapped cluster control component 320. As another example, where additional disks are added to cluster storage construct 302, for example doubling the storage space thereof, mapped cluster control component 320 can correspondingly increase the size of MC 360. As a further example, where a customer downgrades a storage plan, the lower amount of storage space purchased can be indicated in supplemental information 322 and mapped cluster control component 320 can correspondingly reduce the storage space, e.g., remove disk portions, from MC 360-362, etc.

In some embodiments, mapped cluster control component 320 can allocate disk portions based on other supplemental information 322. As an example, where cluster storage construct 302 comprises high cost storage, again cost can be monetary or other costs, and low cost storage, mapped cluster control component 320 can rank the available storage. This can enable mapped cluster control component 320, for example, to allocate the low cost storage into MC 360-362 first. In another example, the rank can allow mapped cluster control component 320 to allocate higher cost storage, such as where cost corresponds to speed of access, reliability, etc., to accommodate clients that are designated to use the higher ranked storage space, such as a client that pays for premium storage space can have their data stored in an MC that comprises higher ranked storage space.

Mapped cluster control component 320 can prevent allocation of disks in order to forestall possible data loss events, e.g., by applying best practices to data storage. In an aspect, disk portions of one real node of cluster storage construct 302 can be allocated to different mapped clusters, for example, MC 360 can comprise disk portion 2.3*m*, corresponding to node 2 disk 3 of cluster storage construct 302, and can comprise disk portion 2.8*m*, corresponding to node 2 disk 8 of cluster storage construct 302. In an aspect, mapped cluster control component 320 can allocate those disks to a same mapped nodes, e.g., disk portion 2.3*m* and disk portion 2.8*m* can be allocated to mapped node 2 of MC 360, as illustrated. In a further aspect, mapped cluster control component 320 can prevent allocation of those disks to different mapped nodes of the same mapped cluster to forestall a possible data loss event, e.g., disk portion 2.3*m* should not be allocated to a first mapped node of MC 360 and disk portion 2.8*m* allocated to a second mapped node of MC 360 because where real node 2 becomes less available, e.g., reboots, crashes, losses connectivity, etc., the loss of real disk portion 2.3 and real disk portion 2.8 would correspondingly affect two mapped nodes, e.g., the first mapped node and the second mapped node, which in turn can result in a data loss event where, for example, data stored on mapped disk portion 2.3*m* and a backup of the data stored on mapped disk portion 2.8*m* become less accessible, e.g., the loss of two mapped nodes due to the loss of one real node can be deemed unacceptable. It is noted that other best practices can also be implemented via mapped cluster control component 320, e.g., to again forestall possible data loss events, etc.

In an embodiment, disk portion 2.3 can be of a first disk type, disk portion 8.3 can be of a second disk type, disk portion 1.5 can be of a third disk type, and disk 2.8 can be of a fourth disk type. As an example, disk portion 2.3 and disk portion 8.3 can be of a SSD disk type, while disk portion 1.5 can be of a 7200 RPM HDD type, and disk portion 2.8 can be of a 5400 RPM HDD disk type. The example disk types can correspond to performance characteristics associated with the given disk type, e.g., the SSD can be associated with high cost, low mean time between failures (MTBF), fast read and write operations of data, etc., the 7200 RPM HDD type can be associated with moderate cost, moderate read/write speeds, and moderate MTB F, etc., and the 5400 RPM HDD type can be associated with low cost, low read/write speeds, and low MTBF. In this example, data 304 can be more rapidly written to SSD type disk portions, and mapped cluster control component 320 can select SSD type disks for inclusion in MC 360, for example, to accommodate fast writing of incoming data, etc. Moreover, in this example, mapped cluster control component 304 can further include other types of disks based on their type characteristics, or in some embodiments, the characteristics of specific disk portions of a specific type, e.g., not all SSD types will have identical characteristics, although generally most SSDs of a type can have similar characteristics. As such, MC 360 can comprise SSDs, 7200 RPM HDDs, and 5400 RPM HDDs, such that, for example, incoming data can be written to the SSD quickly to prevent a potential data bottle neck in writing of data. The example SSD data can then, for example, be moved, after a period of time on the SSDs, to the 7200 RPM HDD where the data may be interacted with above a first threshold of data interaction or written to the 5400 RPM HDD where interaction is below a second threshold of data interaction, e.g., colder data can be written to slower but less expensive and more reliable disks in this example because that data may not be interacted with as frequently as data that can be selectively written to the 7200 RPM HDDs, or in some embodiments, for example very hot data, can remain on the SSD type disks.

In an embodiment, mapped cluster control component 320 can determine allocation of real disk portions to mapped clusters based on the disk type, e.g., based on the disk type itself, based on a characteristic of the disk type, etc. Moreover, cluster control component 320 can determine allocation of real disk portions to mapped clusters based on other factors, which factors can comprise an indicated use factor for the disks in a mapped cluster, e.g., based on a historical data use pattern or an inference about a future data use pattern, based on an indicated future data use, based on a current use of other disks of the real cluster and/or a mapped cluster supported by the real cluster, etc., an agreement with a user of the storage system factor, e.g., from contractual or service agreement indicia, etc., a cluster performance data factor, e.g., from disk aging attribute, monetary cost attribute, maintenance attribute, disk replacement cost attribute, etc., or nearly any other factor germane to selection of a mix of disk types to meet an indicated operation/performance condition, a promised service condition, an efficiency condition, a data protection condition, etc. As an example, a customer that agrees to a low cast data storage service can result in apportioning more low cost disk portions to a corresponding mapped cluster for the customer. As another example, a customer can requests long term storage with few read events, e.g., archival type storage, which can result in selection of more highly reliable disk types rather than fast read/write time disk types. As a further example, a use of a mapped cluster can shift from more archival data storage to a more interactive data storage with high numbers of read/write operations, whereby mapped cluster control component 320 can alter the selected disk portions to include more disk portions of a type that supports high numbers of read/write operations while reducing the number of disks that are more suitable for archival type data storage. Numerous other examples are readily appreciated and are to be considered within the scope of the disclosed subject matter despite not being explicitly recited for the sake of clarity and brevity.

Figure 4:
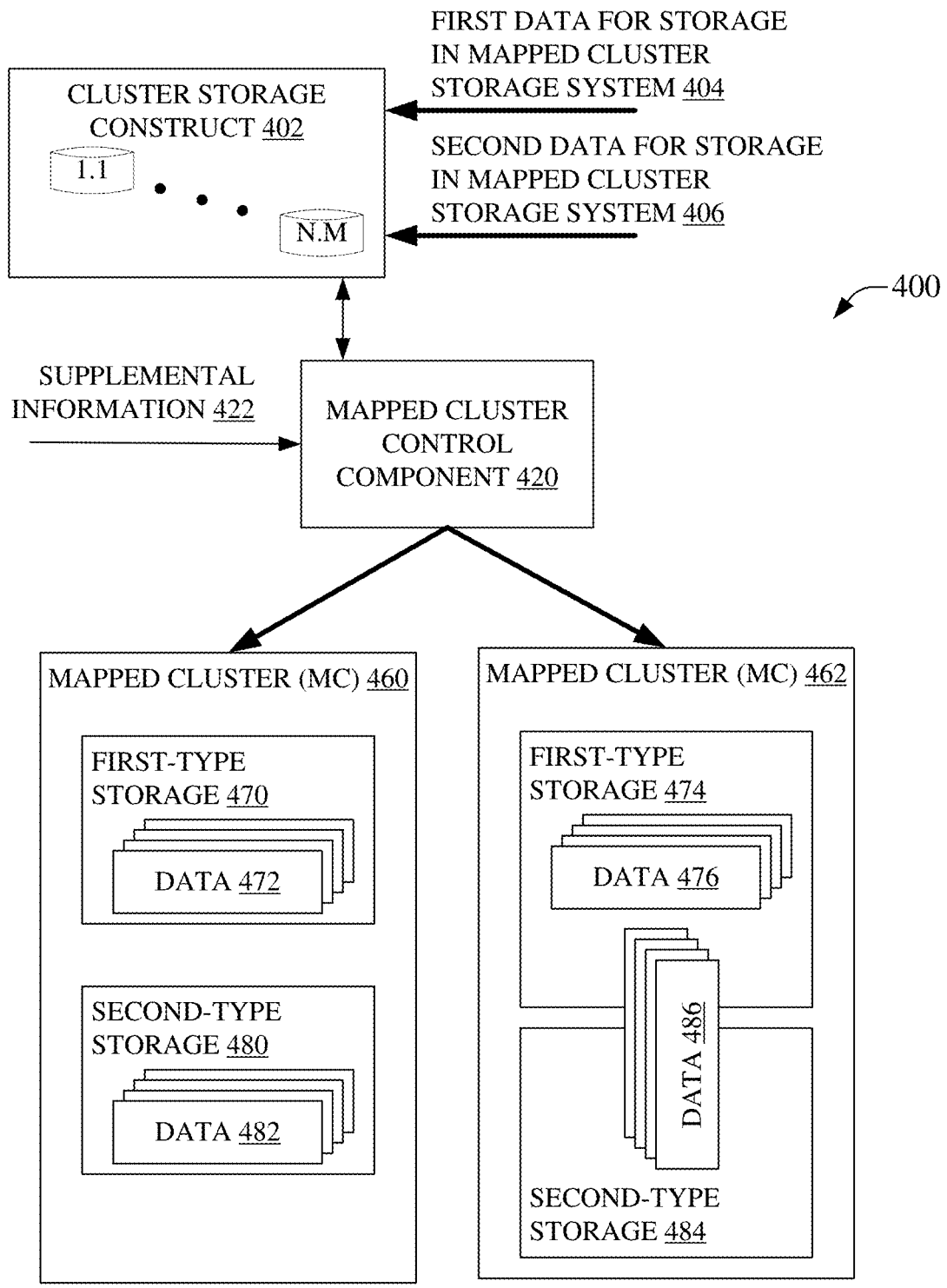
FIG. 4 illustrates an example system that can facilitate storage of data in a mapped redundant array of independent nodes employing different types of storage devices based on a selected data protection scheme, in accordance with aspects of the subject disclosure.

FIG. 4 is an illustration of a system 400, which can enable storage of data in a mapped redundant array of independent nodes employing different types of storage devices based on a selected data protection scheme, in accordance with aspects of the subject disclosure. System 400 can comprise cluster storage construct 402 that can comprise disk portions 1.1 to N.M in a manner that is the same as, or similar to, cluster storage construct 102, 202, 302, etc. Disk portions 1.1 to N.M can be comprised in one or more storage devices of one or more storage device types. Mapped cluster control component 420 can allocate one or more MC, e.g., MC 460-462, etc., as supported by the one or more storage devices of the one or more storage device types, e.g., based on characteristics of the storage device types, etc. In an embodiment, the characteristics of the storage device types can be comprised in supplemental information 422 received by mapped cluster control component 420.

First data for storage in mapped cluster storage system 404, second data for storage in mapped cluster storage system 406, etc., can be received by cluster storage construct 402 for storage according to corresponding mapped clusters, e.g., MC 460, 462, etc. In an embodiment, first data 404, second data 406, etc., can be stored as data 472, 476, 482, 486, etc., stored via different types of storage devices, e.g., first-type storage 470, 474, etc., second type storage 480, 484, etc., or other types of data storage devices. Data 472-484, etc., can represent first data 404, second data 406, etc.

In an aspect, data 472, 476, 482, 486, etc., can comprise a data protection set, wherein a data protection set can comprise a representation of some data and other data, e.g., redundant data, etc., that facilitates recovery of the some data in response to the some data becoming less accessible or not accessible. As an example, first data 404 can comprise a list of products and data 472 can comprise a representation of the list of products and redundant data that allows recovery of the representation of the list of products where the representation of the list of products becomes inaccessible. The redundant data that facilitates the recovery can be a second copy of the representation of the customer list, can be erasure code data that facilitates recovery of the representation of the customer list, can be convolved data that can facilitate recovery of the representation of the customer list, etc. As an example, the erasure code data can be determined from an erasure code scheme, such as a 10+4 erasure code scheme, that can generate 2 protection fragments for every 10 data code fragments, whereby the 2 erasure code fragments can enable recovery of the 10 data code fragments where up to two of the 10 data code fragments become less accessible, lost, damaged, inaccessible, etc. In another example, the convolved data can convolve a copy of the data with other copies of other data in a convolved form that can enable recovery of the data from deconvolving the convolved data. In an embodiment, convolved data can be generated via an XOR operation, e.g., data A XOR'ed with data B can result in convolved data AB, whereby, if data A is lost or less accessible, data B can be employed to deconvolve convolved data AB to recover data A.

In an embodiment, MC 460 can store data 472 in first-type storage 470 and can store data 482 in second-type storage 480. For this embodiment, data 472 can comprise data fragments and redundant data fragments, e.g., erasure code data, convolved data, copies of data, etc., via first-type storage. As an example, a customer list comprised in first data 404 can be stored with corresponding redundant data to enable recovery of the customer list should the stored customer list become less accessible in one or more storage devices of a first storage device type, e.g., the protection set for the customer list, or a protection set for a portion of the customer list, can be stored via HDDs. In this example, recovery from the loss of a portion of the customer list stored on a portion of a first HDD would be enabled by corresponding redundant data stored on a portion of an HDD, e.g., another portion of the same HDD, a portion of another HDD, etc. As such, loss of a portion of a storage device of second-type storage 480 would not affect the recovery in this example. Data stored in a manner similar to that illustrated for MC 460, can be termed a Type I storage scheme.

In an embodiment, MC 462 can store data 476 in first-type storage 474 and can store data 486 in second-type storage 484. For this embodiment, data 476 can comprise data fragments and redundant data fragments, e.g., erasure code data, convolved data, copies of data, etc., via first-type storage that can be similar to that of MC 460. Further, in this embodiment, data 486 can comprise data fragments and redundant data fragments, e.g., erasure code data, convolved data, copies of data, etc., that can be stored via both first-type storage 474 and via second-type storage 484. As an example, a customer list comprised in first data 404 can be stored with corresponding redundant data to enable recovery of the customer list should the stored customer list become less accessible in one or more storage devices of a first storage device type and in one or more storage devices of a second storage device type, e.g., a first portion of the protection set for the customer list can be stored via HDDs and a second portion of the protection set for the customer list can be stored via SSDs. In this example, recovery from the loss of some of the portion of the customer list stored on a portion of a first HDD would be enabled by corresponding redundant data that can be stored on a portion of an SSD, etc. As such, loss of a portion of a storage device of second-type storage 480 can affect the recovery in this example. Data stored in a manner similar to that illustrated for MC 462, can be termed a Type II storage scheme.

Accordingly, a type of data storage scheme for storing data in a hybrid mapped cluster, e.g., a mapped cluster comprising different types of storage devices, can affect how storage devices are selected for inclusion in a hybrid mapped cluster. A type I data storage scheme for a hybrid mapped cluster can prevent two storage device portions of a first type of storage device managed by one real node from being employed in different mapped nodes of one hybrid mapped cluster. This can provide protection against possible data loss events that can result from the loss of the first type of data storage device affecting different mapped nodes in the hybrid mapped cluster. However, a first storage device of a first type of storage device and a second storage device of the first type of storage device, both managed by one real node, can be employed in different mapped nodes of one hybrid mapped cluster. This is allowable because the loss of either the first or second storage device, even though they are of the same type, does not compromise multiple mapped nodes of the hybrid mapped cluster.

Turning to a type II data storage scheme, a hybrid mapped cluster can similarly prevent two storage device portions of a first type of storage device managed by one real node from being employed in different mapped nodes of one hybrid mapped cluster. Again, this can provide protection against possible data loss events that can result from the loss of the first type of data storage device affecting different mapped nodes in the hybrid mapped cluster. Unlike the type I data storage scheme, employing a first storage device of a first type of storage device and a second storage device of the first type of storage device, both managed by one real node, can be prevented for different mapped nodes of one hybrid mapped cluster. This is different from the type I data protection scheme because the loss of either the first or second storage device can compromise multiple mapped nodes of the hybrid mapped cluster where data, e.g., data 486, can be stored across storage devices of different storage device types.

In an aspect, where a hybrid mapped cluster comprises additional storage device types, e.g., a first group of disks of a first type, a second group of disks of a second type, a third group of disks of a third type, etc., the relationship between each pair of storage device types can be of type I or type II data storage scheme. The relationship can be intransitive. As an example, group of disks A of the first disk type can have a type II relationship to group of disks B of the second disk type, and B can have a type II relationship to group of disks C of the third disk type, however group of disks A can have a either a type I or a type II relationship to group of disks C. In an aspect, the data storage scheme can be selectable. As an example, where a customer has paid for a limited amount of first-type storage, e.g., 470, 474, etc., can select, indicate, etc., that data can be also stored on second-type storage, e.g., 484, according to a type II data storage scheme, such as is illustrated by data 486 being stored in both the first-type and second-type storage. However, where this example customer has excess first-type storage, a type I data storage scheme can be selected, which can enable greater flexibility in allocating disks to the hybrid mapped cluster because type I data storage can allow two disks from different groups of a first type of disk to be used in different mapped nodes, unlike a type II data storage scheme.

Figure 5:
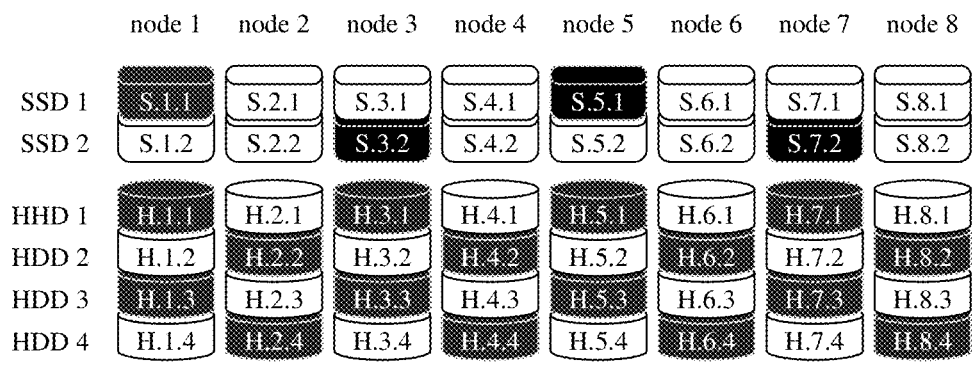
FIG. 5 illustrates an example system that can facilitate storage of data in a mapped redundant array of independent nodes employing three different types of storage devices according to either a type I data storage scheme or a type II data storage scheme, in accordance with aspects of the subject disclosure.
Figure 5:
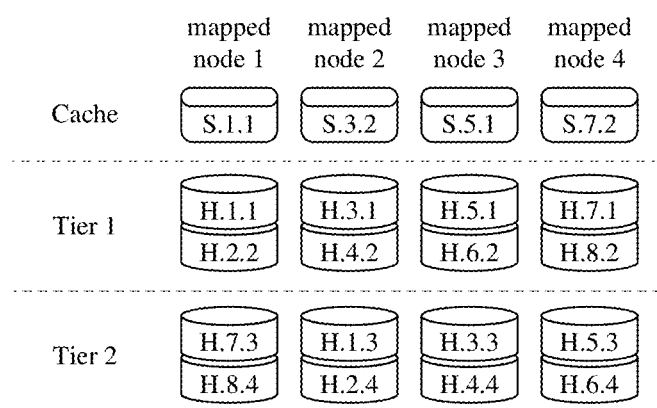

FIG. 5 is an illustration of an example system 500, which can enable storage of data in a mapped redundant array of independent nodes employing three different types of storage devices according to either a type I data storage scheme or a type II data storage scheme, in accordance with aspects of the subject disclosure. System 500 can comprise cluster storage construct 502 that can comprise, for example, real storage devices of different types in one or more real nodes, e.g., real node 1 can comprise SSDs and two types of HDDS, etc. Cluster storage construct 502 can span nodes in different physical locations, e.g., node 1 can be in Seattle, node 2 can be in Los Angeles, node 3 can be in Miami, etc. In an aspect, cluster storage construct 502 can support a mapped cluster, e.g., MC 560, etc.

Mapped cluster 560 can comprise one or more mapped node comprising one or more mapped storage device that can be mapped to one or more portion of a real storage device comprised in one or more node(s) of cluster storage construct 502. Accordingly, MC 560 can comprise different classes of storage device, e.g., mapped node 1 can comprise a mapped disk corresponding to a portion of a real SSD, for example S.1.1 of mapped node 1 can correspond to a portion of real SSD S.1.1, etc. Data storage via MC 560 can be based on a selectable storage scheme between the mapped storage devices of the mapped nodes. In an aspect, the storage scheme, type I storage scheme, type II storage scheme, etc., can dictate how data, e.g., a data protection set, is stored among the storage devices of different classes in a mapped node representation of a mapped cluster, e.g., MC 560, etc., supported by a real cluster, e.g., cluster storage construct 502.

In an embodiment, a disk can be identified by 'type.node#.disk#', e.g., S.1.1 can indicate that the corresponding disk is a portion of a first real disk of a first real node and is of type SSD. Accordingly, cluster storage construct 502 can be regarded as an 8×(2+4) real cluster, e.g., a real cluster having eight real nodes, wherein each real node comprises two real disks of a first type, and four real disks of a second type. MC 560 can be supported by this example real cluster. Illustrated example MC 560 can be understood to be a 4×(1 s+2 h+2 h) mapped cluster, e.g., a mapped cluster having four mapped nodes that comprise a cache level disk comprising a portion of one SSD, a tier 1 level comprising two HDDs, and a tier 2 level comprising two HDDs, e.g., the disks of the mapped cluster map to portions of the real cluster corresponding to portions of real disks of the indicated types.

In the illustrated example mapped cluster, e.g., MC 560, the selected disks comprising MC 560, e.g., selected by a mapped cluster control component (not illustrated) such as MCCC 220, 320, 420, etc., can be selected according to a selected data storage scheme(s). The illustrated example of system 500 illustrates a first selected data scheme between the cache level disks and the tier 1 level disks as type II, e.g., data protection sets can be stored within disks of a class of disk rather than between disks of different disk classes. This selected data storage scheme, as disclosed herein, can be associated with 1) preventing disks of from one group of real node disks of a type of storage device from being mapped to mapped disks of more than one mapped node of MC 560, and 2) preventing disks of from more than one group of real node disks of a type of storage device from being mapped to mapped disks of more than one mapped node of MC 560. These prohibitions can be illustrated in example MC 560 as directing selection of one SSD (S.1.1.) and two HDDs (H.1.1. and H.2.2) from cluster storage construct 502 for use as the cache level and tier 1 level disks of mapped node 1, then prohibiting selection of S.1.2 as a cache level mapped disk in the other mapped nodes of MC 560, prohibiting selection of H.1.2 through H.1.4 as a tier 1 level mapped disk in the other mapped nodes of MC 560, and prohibiting selection of H.2.1 and H.2.3 through H.2.4 as a tier 1 level mapped disk in the other mapped nodes of MC 560, to accord with the type II data storage scheme conventions disclosed herein above.

Moreover, the illustrated example of system 500 further illustrates a second selected data scheme between the tier 1 level disks and the tier 2 level disks as type I, e.g., data protection sets can be stored between disks of different disk classes. Similarly, a third selected data scheme between cache level disks and tier 2 level disks can be selected to be of type I, which again allows data protection sets to be stored between the different disk classes. This selected data storage scheme, as disclosed herein, can be associated with 1) preventing disks of from one group of real node disks of a type of storage device from being mapped to mapped disks of more than one mapped node of MC 560, and 2) allowing disks of from more than one group of real node disks to be mapped to mapped disks of more than one mapped node of MC 560. These selection conditions can be illustrated in example MC 560 as directing selection of one SSD (S.1.1.) and two HDDs (H.7.3. and H.8.4) from cluster storage construct 502 for use as the cache level and tier 2 level disks of mapped node 1, then prohibiting selection of S.1.2 as a cache level mapped disk in the other mapped nodes of MC 560, however, for example, selection of H.1.2 through H.1.4 as a tier 2 level mapped disk in the other mapped nodes of MC 560 can be permitted, e.g., H.1.3, which is a second disk of a second group of real disks, can be permitted to be mapped to a different mapped node, e.g., in tier 2 of mapped node 2, etc., in accord with the type I data storage scheme selected between cache level mapped disks and tier 2 mapped disks in MC 560, and in accord with the type 1 data storage scheme selected between tier 1 mapped disks and tier 2 mapped disks in MC 560. It is noted that other mappings between portions of real disks and mapped disks can also accord with the selected data storage scheme(s) and are to be considered within the scope of the disclosed subject matter even where not explicitly recited for the sake of clarity and brevity. It is further noted that other data storage scheme(s) can be selected between the example mapped disk levels (and that there can be more or fewer mapped disk levels and/or classes of real disks) and that this can result in application of the data storage rules resulting in alternate selection of mappings between real disk portions and mapped disks, which mappings are considered within the scope of the disclosed subject matter even where not explicitly recited, again for the sake of clarity and brevity. As a shorthand, storage of data protection sets across different types of storage devices can be associated with disk selection rules intended to avoid possible data loss events as is disclosed herein and all such rules and the corresponding mappings of mapped disks to portions of real disks of one or more storage device classes is considered within the scope of the disclosed subject matter even where not explicitly recited for the sake of clarity and brevity.

Figure 6:
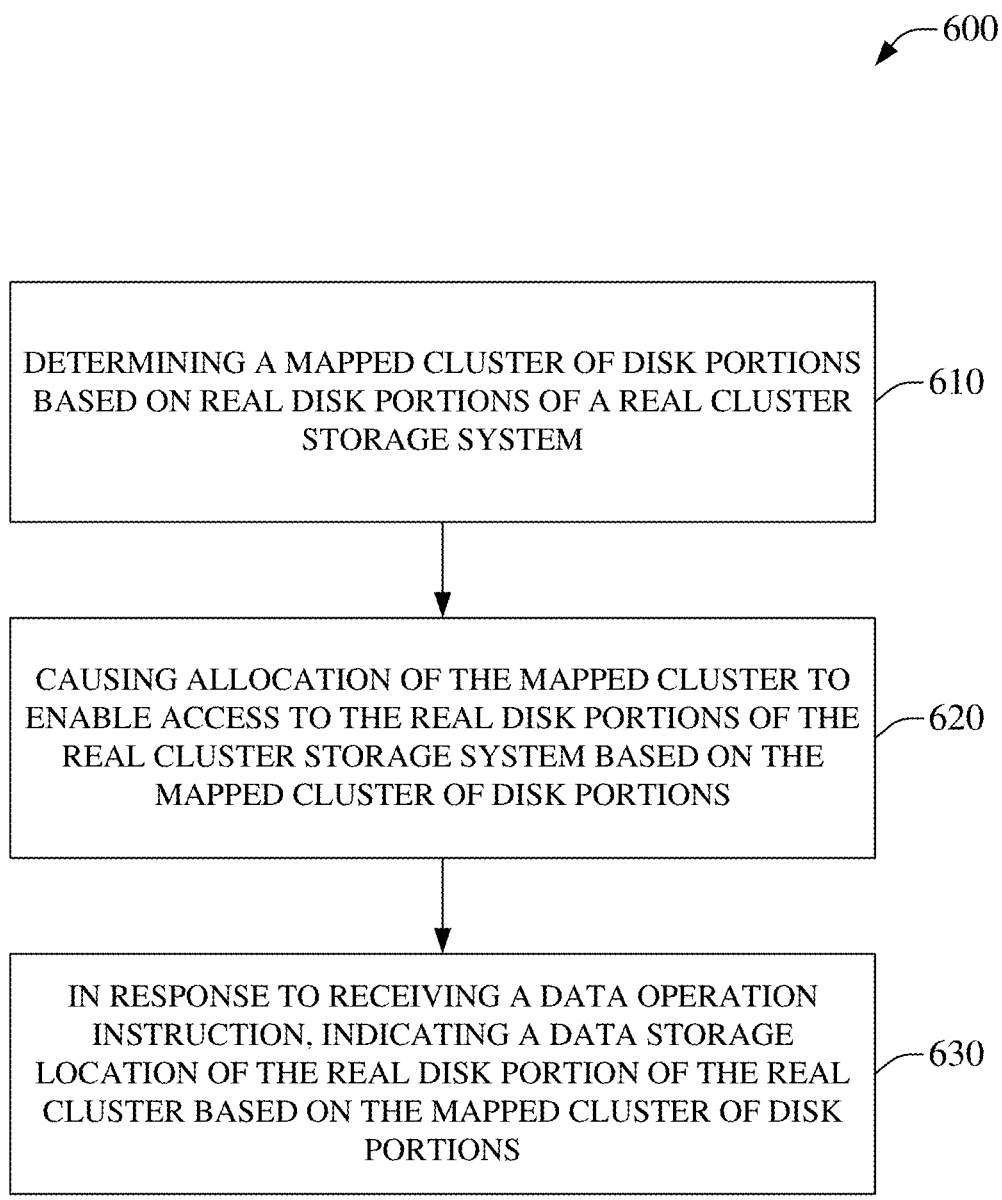
FIG. 6 illustrates an example method that can facilitate storage of data via a mapped redundant array of independent nodes, wherein the mapped disks can be of different storage device types, in accordance with aspects of the subject disclosure.
Figure 7:
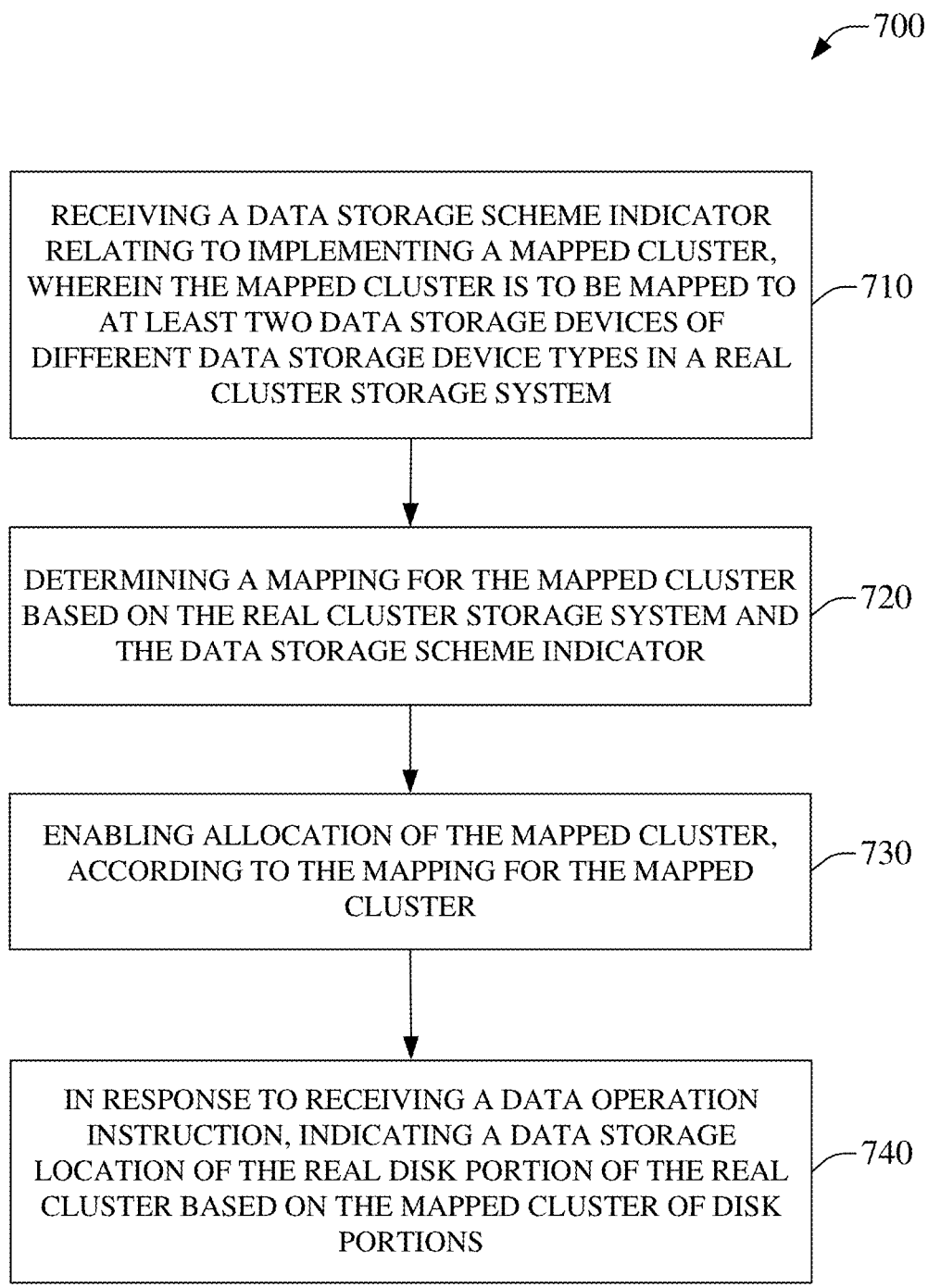
FIG. 7 is an illustration of an example method enabling storage of data according to a storage scheme in a mapped redundant array of independent nodes, wherein the mapping of mapped disks to real disks is determined according to the storage scheme, in accordance with aspects of the subject disclosure.
Figure 8:
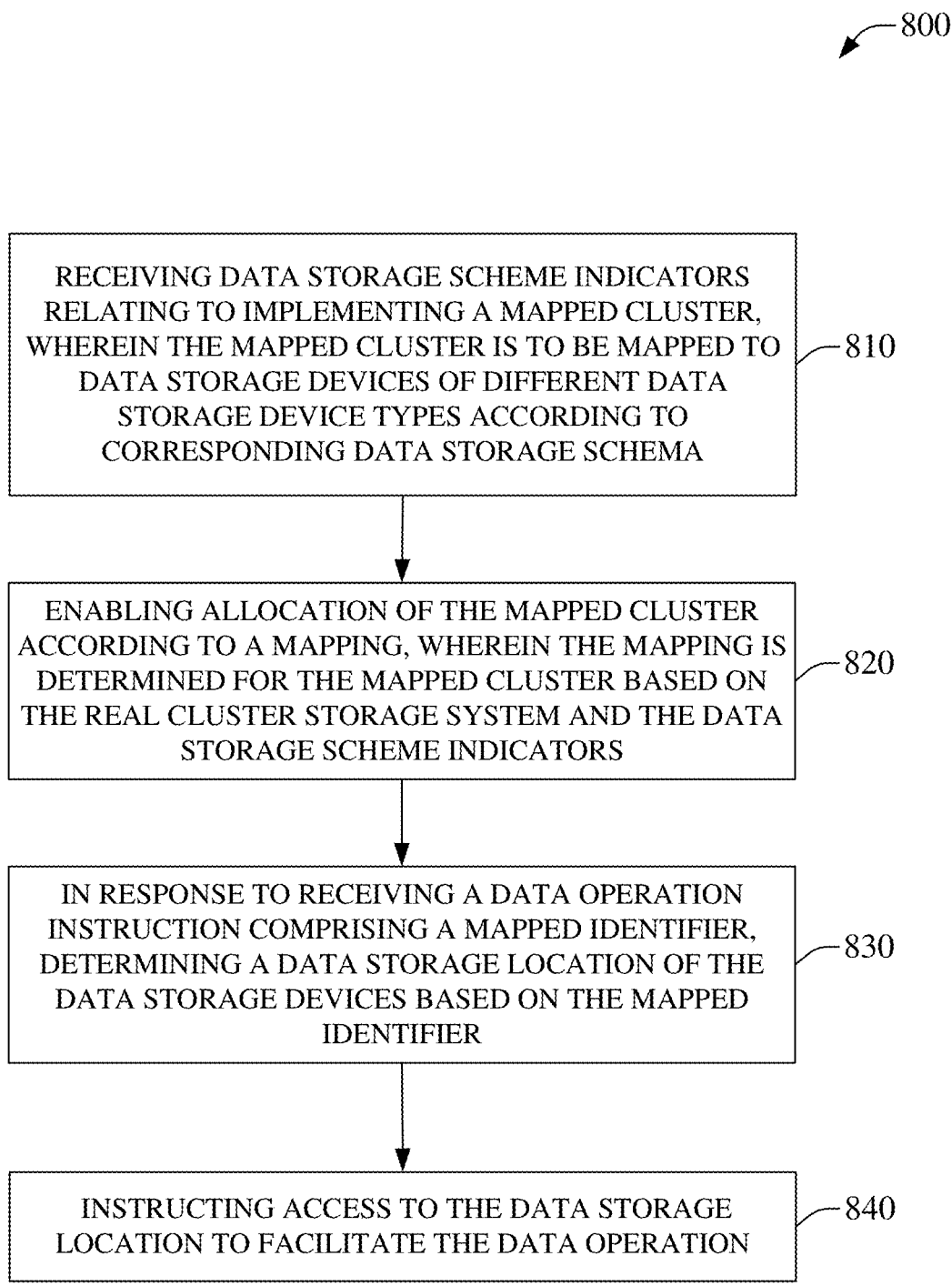
FIG. 8 illustrates an example method that facilitating storage of data according to different storage schema in a mapped redundant array of independent nodes, wherein the mapping of mapped disks to real disks is determined according to the different storage schema, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can enable storage of data via a mapped redundant array of independent nodes, wherein the mapped disks can be of different storage device types, in accordance with aspects of the subject disclosure. At 610, method 600 can comprise determining a mapped cluster of disk portions. The determining can be based on real disk portions of a real cluster storage system. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc. Accordingly, in an embodiment, cluster storage system can support a mapped cluster enabling data to be stored on one or more disk portion, e.g., 140 through 148, 150-158 of system 100, disk portions 1.1 through N.M of system 200, 300, 400, disks S.1.1 through H.8.4 of system 500, etc., according to a mapped cluster scheme. In an aspect, a mapped cluster control component, e.g., mapped cluster control component 220-420, etc., can coordinate storage of data on storage elements, or portions thereof, of a real cluster of cluster storage system according to a mapping of a mapped cluster, e.g., mapped cluster control component 220-420, etc., can indicate where to store data in a real cluster storage system, can cause data to be stored at a location in a cluster storage system based on the mapping of the mapped cluster, etc.

Accordingly, a mapped cluster can be comprised in, e.g., map to, one or more portions of one or more real cluster. The mapped cluster can be N' nodes by M' disks in size and the one or more real clusters of cluster storage system can be N nodes by M disks in size, where N' can be less than, or equal to, N, and M' can be less than, or equal to, or greater than, M. In these embodiments, the mapped cluster can be smaller than cluster storage system size. In some embodiments, a mapped cluster can comprise storage space from more than one real cluster of the real cluster storage system. In some embodiments, a mapped cluster can comprise storage space from real nodes in different geographical areas. In some embodiments, a mapped cluster can comprise storage space from more than one real cluster in more than one geographic location.

At 620, method 600 can comprise causing allocation of the mapped cluster. The allocation of the mapped cluster can enable access to the real disk portion of the real cluster storage system. Access can be based on the mapped cluster disk portions. In an aspect, the mapping of the mapped cluster disk portions to the real cluster real disk portions can enable accessing a real data storage location, e.g., to read, write, erase, alter, etc., data corresponding to the real data storage location based on a corresponding mapped disk portion.

Method 600, at 630, can indicate a data storage location in response to receiving a data operation instruction. At this point method 600 can end. In an aspect, the data storage location can be comprised in a real disk portion of the real cluster. The data location can be based on the mapped cluster of the disk portions.

In an aspect, a mapped cluster can be allocated based on an indicated level of granularity, an attribute or characteristic of a class of a data storage device, an indication of a data storage scheme, etc. In an aspect, these indications can be determined based on an amount of data to store, a determined level of storage space efficiency for storing data, a customer/subscriber agreement criterion, an amount of storage in cluster storage system, network/computing resource costs, wherein costs can be monetary or other costs, etc., e.g., supplemental information 322, 422, etc. The supplemental information can be used in the allocating mapped storage space for the mapped cluster. In some embodiments, allocation can be unconstrained, while in other embodiments, constraints can be applied when allocating a mapped cluster, see FIG. 4 illustrating data storage schema that can correspond to different constraints, which constraints can result in allocating different portions of real storage device that, for example, can reduce a possibility of a data loss event occurring by selecting an appropriate mapping of real disk portions to mapped disks in mapped nodes that allows storage of data that is more resilient to real disks becoming less accessible, inaccessible, etc. As an example, a selected mapping can prohibit allocating real storage devices to two mapped clusters that each use a disk from a same real node to forestall a potential data loss event of the two mapped clusters that could result from difficulty accessing the same real node. Other constraints can be readily appreciated, for example, based on a type of data redundancy schema, based on available/use storage space, based on network/computing resource costs, etc., and all such constraints are within the scope of the instant disclosure even where not recited for clarity and brevity.

FIG. 7 is an illustration of an example method 700, which can facilitate storage of data according to a storage scheme in a mapped redundant array of independent nodes, wherein the mapping of mapped disks to real disks is determined according to the storage scheme, in accordance with aspects of the subject disclosure. At 710, method 700 can comprise receiving a data storage scheme indicator. The data storage scheme indicator can relate to implementing a mapped cluster, e.g., provisioning, creating, modifying, etc., a mapped cluster in a manner that accommodates the data storage scheme. In an aspect, the mapped cluster is to be mapped to at least two data storage devices of a real cluster storage system and the data storage devices are to be of different data storage device types. In an aspect, a storage device type, class, etc., can correspond to characteristics of the devices of the type, class, etc. As an example, a type, class, etc., can relate to a brand of storage device, a speed of a storage device, an age of a storage device, etc., e.g., a first class of storage devices can be HDDs, a second class of storage devices can be SSDs, a third class of storage devices can be MRAM, a fourth class of storage devices can be optical storage devices, etc. The differing characteristics can be leveraged to selectively store data based on a storage device type, for example, newly arriving data can be stored in a SSD based on the SSD being associated with fast data access, data that is interacted with above a first threshold level can be stored on a 10,000 RPM HDD, while 'cold' data can be stored in a 5400 RPM HDD, etc. However, the disclosed subject matter can also enable use of different storage device types for the same types of storage. As an example, a first group of HDDs can be a first class of storage devices while a second group of HDDs with different characteristics, attributes, etc., can be a second class of storage devices. Moreover, different groups of storage devices from one or more classes/types of storage devices can be defined, e.g., a first group of a first class of storage devices can be defined as different from a second group of the first class of storage devices. As an example, where a pool of storage devices comprises some SSDs and some HDDs, the SSDs can be a first type and the HDDs can be a second type, whereby a first group of SSDs and a second group of HDDs can be selected, a first group of SSDs and a second group of SSDs can be selected, a first group of HDDs and a second group of HDDs can be selected, etc.

At 720, a mapping for the mapped cluster can be determined. The determining the mapping can be based on the real cluster storage system and the data storage scheme indicator, e.g., based on a data storage scheme indicated by the data storage scheme indicator, based on the data storage scheme indictor itself, etc. The mapping can embody selection of real storage devices of different types to support a hybrid mapped cluster, e.g., a mapped cluster than directs data interactions to real disks of different disk types. As an example, the mapping can provide for a mapped cluster to comprise access to disks of a first type, a second type, etc. This example mapping can allow interactions with a resulting mapped cluster than can allow storage of data that leverages an attribute, characteristic, etc., of the different disk types. As an example, a customer can indicate that frequently access data is to be stored in a mapped first disk type, e.g., frequently accessed data can be stored in a mapped SSD rather than in a mapped magnetic tape drive to provide more rapid interactions with the data where disks of the SSD class generally has faster data access times than disks of the magnetic tape drive class. Numerous other examples are readily appreciated and are all considered within the scope of the disclosed subject matter regardless of not being explicitly recited for the sake of clarity and brevity. Accordingly, a mapped cluster can be comprised in, e.g., map to, one or more portions of one or more real clusters that can comprise one or more disks of one or more data storage device types.

At 730, method 700 can comprise enabling allocation of the mapped cluster according to the mapping for the mapped cluster. The allocation of the mapped cluster can create relationships between a mapped cluster representation and a corresponding portion of a real storage device that can enable access to the real disk portion of the real cluster storage system based on an interaction with the mapped cluster representation. Access to data can therefore be based on interactions with the representation of the mapped cluster. In an aspect, the mapping of the mapped cluster disk portions to the real cluster real disk portions can enable accessing a real data storage location, e.g., to read, write, erase, alter, etc., data corresponding to the real data storage location based on a corresponding mapped disk portion. As such, an interaction with a mapped SSD can cause an interaction with a corresponding real SSD of a real cluster, an interaction with a mapped disk of different types can result in interaction with corresponding real disks of the different types in a real cluster, etc.

Method 700, at 740, can indicate a data storage location in response to receiving a data operation instruction. At this point method 700 can end. In an aspect, the data storage location can be comprised in a real disk portion of the real cluster, wherein the real cluster can comprise real disks of different disk types. The data location can be based on the mapped cluster.

In an aspect, where the mapped cluster can be allocated based on an attribute or characteristic of a class of a data storage device, an indication of a data storage scheme, etc., a data storage scheme can correspond to a constraint, which constraint can result in allocating a real storage device in accord with best practices, e.g., to reduce a possibility of a data loss event, etc. As an example, the mapping can be determined to cause selection of appropriate real disk portions relative to how data, e.g., data protection sets, can be stored, which can enable storage of data that is more resilient to real disks becoming less accessible, inaccessible, etc. As an example, a selected mapping can prohibit allocating two or more disks, from one group of disks of a first disk class managed by a first real node, to different mapped nodes of one hybrid mapped cluster. As a second example, a selected mapping can prohibit allocating a first disk, from a first group of disks of a first disk class, and a second disk, from a second group of disks of a second disk class, both managed by a first real node, to different mapped nodes of one hybrid mapped cluster. In an aspect, these example constraints can serve to reduce a likelihood of a data loss event where, for example, the example real node becomes less accessible, not accessible, etc. As an example, where a mapped cluster is allocated that contravenes the first example constraint, e.g., two real disks from a first group of a first class of disks managed by a first real node are allocated to two different mapped clusters, then loss of the real node can result in the two mapped nodes becoming correspondingly less accessible and, in some example instances such as, where the second mapped node holds redundant data for the first mapped node, loss of the first node and the redundant data for the first node can cause a data loss event. Other constraints can be readily appreciated, for example, based on a type of data redundancy schema, based on available/use storage space, based on network/computing resource costs, etc., and all such constraints are within the scope of the instant disclosure even where not recited for clarity and brevity.

FIG. 8 is an illustration of an example method 800, which can enable storage of data according to different storage schema in a mapped redundant array of independent nodes, wherein the mapping of mapped disks to real disks is determined according to the different storage schema, in accordance with aspects of the subject disclosure. At 810, method 800 can comprise receiving data storage scheme indicators, e.g., indicators for different data storage schema to be used in a mapped cluster. The data storage scheme indicators can relate to implementing a mapped cluster, e.g., provisioning, creating, modifying, etc., a mapped cluster in a manner that accommodates different data storage schema. Generally, such a mapped cluster can comprise different tiers of mapped storage that can be mapped to different classes of real storage devices of a real cluster storage system.

At 820, a mapped cluster can be allocated based on a mapping for the mapped cluster, which can be determined based on the real cluster storage system and the data storage scheme indicators, e.g., based on the several data storage schema indicated by the data storage scheme indicators, based on the data storage scheme indictors themselves, etc. As an example, the mapping can provide for a mapped cluster to comprise access to disks of a first type, a second type, a third type, etc., wherein the data storage scheme between disks of the first type and disks of the second type can be different than a data storage scheme between the disks of the second type and disks of a third type, etc. As a second example, the mapping can provide for a mapped cluster to comprise access to a first group of disks of a first type, a second group of disks of a second type, a third group of disks of the second type, etc., wherein the data storage scheme between the first group of disks of the first type and the second group of disks of the second type can be different than a data storage scheme between the second group of disks of the second type and the third group of disks of the second type, etc. These example mappings can allow interactions with a resulting mapped cluster than can allow storage of data that leverages an attribute, characteristic, etc., of the different disk types. As an example, a first data storage scheme can store a data, e.g., a data protection set, etc., on disks of a first type, e.g., the data is not stored between disks of different types. As another example, a second data storage scheme can store data between disks of a first type and a second type, etc., e.g., data can be written between some SSDs and some HDDs, etc. Moreover, a mapped cluster can correspond to storing data according to different data storage scheme relative to different groups, tiers, etc., of disks. As an example, where a mapped cluster comprises a first tier of mapped disks, a second tier of mapped disks, and a third tier of mapped disks, a first data storage scheme relationship between the first and second tier disks can store data on disks within a tier and not between tiers while, simultaneously, second data storage scheme relationship between the second and third tier disks can store data on disks of both tiers, e.g., between disks of tiers two and three, and further, a third data storage scheme relationship between the first and third tier disks can exist.

At 830, method 800, in response to receiving a data operation instruction comprising a mapped identifier, can determine a data storage location based on the mapped identifier. Then at 840, method 800 can instruct access to the data storage location to facilitate the data operation. At this point method 800 can end. In an aspect, the data storage location can be comprised in a real disk portion of the real cluster, wherein the real cluster can comprise real disks of different disk types, and wherein the disks can store data according to different data storage schema. The data storage location can be determined based on the mapped cluster allocated.

In an aspect, where the mapped cluster can be allocated based on an attribute or characteristic of a class of a data storage device, an indication of data storage schema, etc., a data storage scheme can correspond to a constraint, which constraint can result in allocating a real storage device in accord with best practices, e.g., to reduce a possibility of a data loss event, etc. As an example, the mapping can be determined to cause selection of appropriate real disk portions relative to how data, e.g., data protection sets, can be stored, which can enable storage of data that is more resilient to real disks becoming less accessible, inaccessible, etc. As another example, a selected mapping can prohibit allocating two or more disks, from one group of disks of a first disk class managed by a first real node, to different mapped nodes of one hybrid mapped cluster. As a second example, a selected mapping can prohibit allocating a first disk, from a first group of disks of a first disk class, and a second disk, from a second group of disks of a second disk class, both managed by a first real node, to different mapped nodes of one hybrid mapped cluster. As such, in an example mapped cluster having three tiers, the first example constraint can exist between two of the three tiers and both the first and second example constraint can exist between another two of the three tiers. In an aspect, these example constraints can serve to reduce a likelihood of a data loss event where, for example, the example real node becomes less accessible, not accessible, etc. As an example, where a mapped cluster is allocated that contravenes the second example constraint, e.g., a first real disk from a first group of disks managed by a first real node and a second real disk from a second group of disks managed by a first real node are allocated to two different mapped clusters, then loss of the real node can result in the two mapped nodes becoming correspondingly less accessible and, in some example instances such as, where the second mapped node holds redundant data for the first mapped node, loss of the first node and the redundant data for the first node can cause a data loss event. Other constraints can be readily appreciated, for example, based on a type of data redundancy schema, based on available/use storage space, based on network/computing resource costs, etc., and all such constraints are within the scope of the instant disclosure even where not recited for clarity and brevity.

Figure 9:
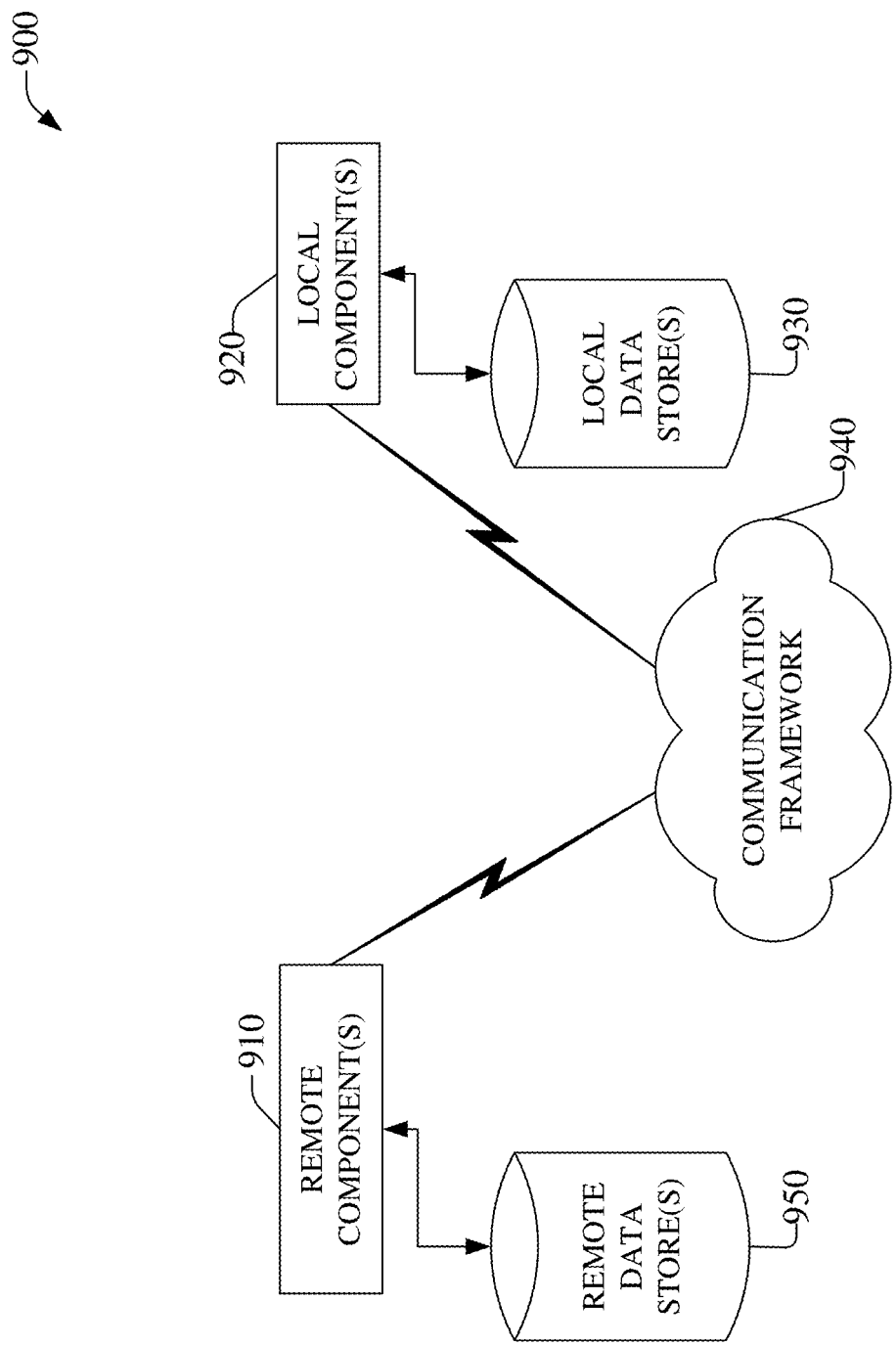
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located cluster storage device, e.g., embodied in a cluster storage construct, such as 102-502, etc., connected to a local mapped cluster control component, e.g., 220-420, etc., via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local mapped cluster control component, e.g., 220-420, etc., connected to a remotely located storage devices via communication framework 940. In an aspect the remotely located storage devices can be embodied in a cluster storage construct, such as 102-502, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to a mapped data storage location can be communicated via communication framework 940 to other devices, e.g., to facilitate access to a real data storage location, as disclosed herein.

Figure 10:
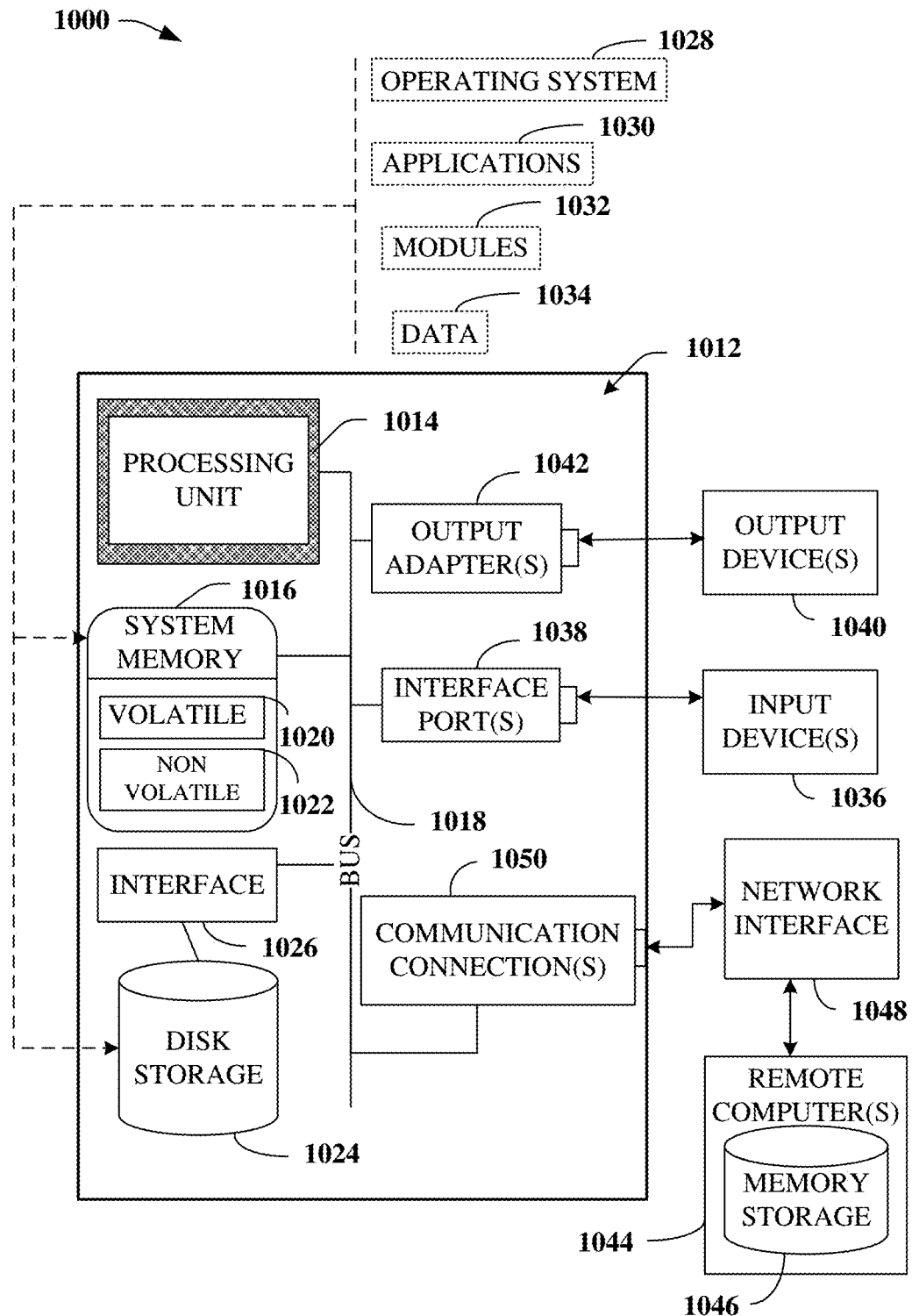
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct, such as 102-502, etc., in mapped cluster control component, e.g., 220-420, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a machine-readable or computer-readable medium can comprise executable instructions stored thereon that, in response to execution, can cause a system comprising a processor to perform operations, comprising receiving a indications of attributes of disk types for disks in a real cluster storage system, determining a mapping for a mapped cluster based on the indications, and writing a data protection set to the disks based on the mapping of the mapped cluster, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (X) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
in response to receiving real cluster storage system criterion data representative of a real cluster storage system criterion for a real cluster storage system, determining a first mapped cluster schema based on the real cluster storage system criterion, a first attribute of a first storage device type, and a second attribute of a second storage device type, wherein the real cluster storage system comprises a first storage device of the first storage device type and a second storage device of the second storage device type;
allocating storage space of the real cluster storage system as a first mapped cluster based on the first mapped cluster schema, wherein the first mapped cluster maps to a first portion of the first storage device and maps to a second portion of the second storage device, wherein the first mapped cluster comprises a first tier of storage mapping to first storage devices of the first storage device type, wherein the first storage devices comprise the first storage device, wherein the first mapped cluster comprises a second tier of storage mapping to second storage devices of the second storage device type, and wherein the second storage devices comprise the second storage device; and
facilitating a data operation corresponding to a data storage location comprised in the real cluster storage system according to the first mapped cluster based on the first mapped cluster schema.

2. The system of claim 1, wherein the allocating the storage space as the first mapped cluster is further based on a selectable data storage scheme.

3. The system of claim 2, wherein the selectable data storage scheme is selected based on an input received via a customer interface device.

4. The system of claim 2, wherein the selectable data storage scheme is selected based on a historical data operation attribute.

5. The system of claim 2, wherein the selectable data storage scheme is selected based on an inference about a future data operation attribute.

6. The system of claim 1, wherein the operations further comprise:
storing data on the first tier of storage comprising storing a protection set via the first storage devices and not storing the protection set via the second storage devices, and wherein the protection set comprises the data and redundant data corresponding to the data.

7. The system of claim 1, wherein the operations further comprise:
storing data on the first tier of storage comprising storing a first portion of a protection set via the first storage devices and storing a second portion of the protection set via the second storage devices, and wherein the protection set comprises the data and redundant data corresponding to the data.

8. A method, comprising:
receiving, by a system comprising a processor and a memory, real cluster storage system criteria for a real cluster storage system comprising a first storage device of a first storage device class and a second storage device of a second storage device class;
determining, by the system, a first characteristic of the first storage device type;
determining, by the system, a second characteristic of the second storage device type;
allocating, by the system, a mapped cluster, wherein the mapped cluster is mapped to a group of storage devices of the real cluster storage system, wherein the group of storage devices comprise the first storage device and the second storage device, wherein the mapped cluster comprises a first tier of storage mapping to first storage devices of the first storage device type, wherein the first storage devices comprise the first storage device, wherein the mapped cluster comprises a second tier of storage mapping to second storage devices of the second storage device type, wherein the second storage devices comprise the second storage device, and wherein the allocating is based on the real cluster storage system criteria, the first characteristic, and the second characteristic; and
causing, by the system, a data operation to occur via the storage devices of the real cluster storage system mapped to the mapped cluster.

9. The method of claim 8, wherein the allocating the mapped cluster is further based on a data storage scheme determined based on historical data operations associated with a customer identity.

10. The method of claim 8, wherein the allocating the mapped cluster is further based on a data storage scheme determined based on an indicator value indicating future data operations to be supported by the mapped cluster, and wherein the indicator value is received via a user interface of a customer device.

11. The method of claim 8, wherein the allocating the mapped cluster is further based on a data storage scheme determined based on an inference of future data operations to be supported by the mapped cluster.

12. The method of claim 8, wherein the causing the data operation to occur comprises writing a data protection set to the first storage devices of the group of storage devices and not writing a portion of the data protection set to the second storage devices of the group of storage devices, and wherein the data protection set comprises data and recovery data facilitating recovery of the data.

13. The method of claim 8, wherein the causing the data operation to occur comprises writing a first portion of a data protection set to the first storage devices of the group of storage devices and writing a second portion of the data protection set to the second storage devices of the group of storage devices, and wherein the data protection set comprises data and recovery data facilitating recovery of the data.

14. The method of claim 8, wherein the causing the data operation comprises writing a portion of a data protection set, wherein the data protection set comprises data and recovery data facilitating recovery of the data, wherein the data comprises an erasure coding data fragment, and wherein the recovery data comprises an erasure coding code fragment.

15. A non-transitory machine-readable medium, comprising executable instructions that, when executed by a processor, facilitate performance of operations, comprising:
  receiving a first indication of a first attribute of a first disk of a first disk type, wherein the first disk is comprised in a real cluster storage system;
  receiving a second indication of a second attribute of a second disk of a second disk type, wherein the second disk is comprised in the real cluster storage system;
  determining a mapping for a mapped cluster based on the first indication and the second indication, wherein the mapped cluster maps to disks of the real cluster storage system, and wherein the disks comprise the first disk and the second disk; and
  writing a data protection set to the disks of the real cluster storage system based on the mapping of the mapped cluster, wherein the data protection set comprises data and recovery data enabling recovery of the data.

16. The non-transitory machine-readable medium of claim 15, wherein the determining the mapping is further based on a selectable data storage scheme.

17. The non-transitory machine-readable medium of claim 16, wherein the selectable data storage scheme is selected based on selection information received from a client device or selection information determined from historical real cluster storage system use associated with a client identity.

18. The non-transitory machine-readable medium of claim 15, wherein the writing the data protection set to the disks comprises writing all of the data protection set to a first portion of the disks, wherein the first portion of the disks are of the first disk type and comprise the first disk, and not writing any of the protection set to a second portion of the disks, and wherein the second portion of the disks are of the second disk type and comprise the second disk.

19. The non-transitory machine-readable medium of claim 15, wherein the writing the data protection set to the disks comprises writing a first portion of the data protection set to a first portion of the disks, wherein the first portion of the disks are of the first disk type and comprise the first disk, and writing a second portion of the protection set to a second portion of the disks, and wherein the second portion of the disks are of the second disk type and comprise the second disk.

20. The non-transitory machine-readable medium of claim 15, wherein the data protection set comprises data and recovery data facilitating recovery of the data, wherein the data comprises an erasure coding data fragment, and wherein the recovery data comprises an erasure coding code fragment.

* * * * *